United States Patent
Felix et al.

(10) Patent No.: US 11,269,806 B2
(45) Date of Patent: Mar. 8, 2022

(54) DATA EXCHANGE PATHWAYS BETWEEN PAIRS OF PROCESSING UNITS IN COLUMNS IN A COMPUTER

(71) Applicant: Graphcore Limited, Bristol (GB)

(72) Inventors: Stephen Felix, Bristol (GB); Simon Christian Knowles, Corston (GB)

(73) Assignee: Graphcore Limited, Bristol (GB)

( * ) Notice: Subject to any disclaimer, the term of this patent is extended or adjusted under 35 U.S.C. 154(b) by 0 days.

(21) Appl. No.: 16/419,535

(22) Filed: May 22, 2019

(65) Prior Publication Data

US 2020/0201811 A1 Jun. 25, 2020

(30) Foreign Application Priority Data

Dec. 21, 2018 (GB) ..................................... 1821132

(51) Int. Cl.
*G06F 15/80* (2006.01)
*G06F 9/30* (2018.01)
(Continued)

(52) U.S. Cl.
CPC .......... *G06F 15/80* (2013.01); *G06F 9/30032* (2013.01); *G06F 9/52* (2013.01); *G06F 9/522* (2013.01)

(58) Field of Classification Search
CPC .. G06F 15/80; G06F 15/8023; G06F 15/8046; G06F 9/30032; G06F 9/52;
(Continued)

(56) References Cited

U.S. PATENT DOCUMENTS 5,005,120 A * 4/1991 Ruetz ................. H03H 17/0009
370/537
5,434,861 A * 7/1995 Pritty .................... H04L 12/403
340/3.51
(Continued)

FOREIGN PATENT DOCUMENTS

GB 2569268 A 6/2019
JP 2006-518069 A 8/2006
(Continued)

OTHER PUBLICATIONS

Kung, SY. VLSI Array Processors. IEEE ASSP Magazine, vol. 2, Iss 3, Jul. 1985, pp. 4-22, [retrieved on Jul. 27, 2020], Retrieved from the Internet <URL: https://ieeexplore.ieee.org/stamp/stamp.jsp?tp=&arnumber=1163741 > <DOI: 10.1109/MASSP.1985.1163741 >.*
(Continued)

*Primary Examiner* — Shawn Doman
(74) *Attorney, Agent, or Firm* — Haynes and Boone, LLP

(57) ABSTRACT

A time deterministic computer is architected so that exchange code compiled for one set of tiles, e.g., a column, can be reused on other sets. The computer comprises: a plurality of processing units each having an input interface with a set of input wires, and an output interface with a set of output wires; a switching fabric connected to each of the processing units by the respective set of output wires and connectable to each of the processing units by the respective set of output wires and connectable to each of the processing units by the respective input wires via switching circuitry controllable by its associated processing unit; the processing units arranged in columns, each column having a base processing unit proximate the switching fabric and multiple processing units one adjacent the other in respective positions in the direction of the column, wherein to implement exchange of data between the processing units at least one processing unit is configured to transmit at a transmit time
(Continued)

a data packet intended for a recipient processing unit onto its output set of connection wires, the data packet having no destination identifier of the recipient processing unit but destined for receipt at the recipient processing unit with a predetermined delay relative to the transmit time, wherein the predetermined delay is dependent on an exchange pathway between the transmitting and recipient processing units, wherein the exchange pathway between any pair of transmitting and recipient processing unit at respective positions in one column has the same delay as the exchange pathway between each pair of transmitting and recipient processing units at corresponding respective positions in the other columns.

22 Claims, 20 Drawing Sheets

(51) Int. Cl.
*G06F 9/52* (2006.01)
*G06F 9/38* (2018.01)
*G06F 15/173* (2006.01)
*G06F 9/54* (2006.01)
*G06F 9/48* (2006.01)
*G06F 13/40* (2006.01)

(58) Field of Classification Search
CPC .. G06F 9/522; G06F 13/4022; G06F 13/3625; G06F 13/362; G06F 13/4273; G06F 13/4278
USPC ........................................ 712/11, 18, 19, 29
See application file for complete search history.

(56) References Cited

U.S. PATENT DOCUMENTS

| | | | | |
|---|---|---|---|---|
| 5,511,221 A * | 4/1996 | Kaneko | G06F 13/4022 | 709/200 |
| 5,802,385 A * | 9/1998 | Densham | H04H 60/04 | 712/16 |
| 5,978,260 A * | 11/1999 | Trimberger | H03K 19/17758 | 365/182 |
| 6,011,793 A * | 1/2000 | Smith | H04L 12/5601 | 370/395.7 |
| 6,226,757 B1 * | 5/2001 | Ware | G06F 13/4226 | 713/401 |
| 6,404,224 B1 * | 6/2002 | Azegami | G11C 19/28 | 326/38 |
| 6,405,299 B1 * | 6/2002 | Vorbach | H03K 19/17704 | 712/10 |
| 6,654,834 B1 * | 11/2003 | Robertson | G06F 15/173 | 709/216 |
| 7,100,021 B1 | 8/2006 | Marshall | | |
| 7,595,659 B2 * | 9/2009 | Vorbach | G06F 15/7867 | 326/38 |
| 7,787,488 B2 * | 8/2010 | Jiang | H04B 7/2656 | 370/458 |
| 7,818,725 B1 * | 10/2010 | Agarwal | G06F 15/17318 | 717/136 |
| 7,948,265 B1 * | 5/2011 | Young | H03K 19/0966 | 326/38 |
| 8,098,081 B1 * | 1/2012 | Trimberger | H03K 19/17736 | 326/41 |
| 8,489,752 B2 * | 7/2013 | Kruger | G06F 13/387 | 709/229 |
| 9,158,575 B2 | 10/2015 | Smith | | |
| 9,917,667 B2 * | 3/2018 | Leng | H04B 7/2643 | |
| 10,168,954 B2 * | 1/2019 | Takefman | G06F 9/4406 | |
| 10,664,561 B1 * | 5/2020 | Kar | G06F 30/327 | |
| 2003/0018737 A1 * | 1/2003 | Buhlman | G06F 15/17381 | 709/213 |
| 2004/0025005 A1 * | 2/2004 | Vorbach | G06F 9/3897 | 713/100 |
| 2004/0111546 A1 * | 6/2004 | Dhong | G06F 13/4243 | 710/100 |
| 2006/0136605 A1 * | 6/2006 | Olukotun | G06F 13/1657 | 710/1 |
| 2007/0250682 A1 | 10/2007 | Moore | | |
| 2009/0288056 A1 * | 11/2009 | Gitchev | G06F 30/394 | 716/126 |
| 2010/0005206 A1 * | 1/2010 | Hnatko | G06F 13/4243 | 710/107 |
| 2010/0238942 A1 * | 9/2010 | Estan | H04L 45/00 | 370/401 |
| 2011/0119469 A1 * | 5/2011 | Ohmacht | G06F 9/30047 | 712/216 |
| 2011/0219208 A1 * | 9/2011 | Asaad | G06F 12/0862 | 712/12 |
| 2012/0303933 A1 * | 11/2012 | Manet | G06F 9/3885 | 712/30 |
| 2014/0044135 A1 * | 2/2014 | Sankaralingam | H04L 45/745 | 370/401 |
| 2014/0304543 A1 * | 10/2014 | Ilyas | G06F 1/12 | 713/401 |
| 2015/0363166 A1 * | 12/2015 | Christidis | G06F 13/1663 | 710/117 |
| 2017/0249276 A1 * | 8/2017 | Kim | G06F 11/0745 | |
| 2019/0197006 A1 * | 6/2019 | Teh | G06F 13/1673 | |
| 2019/0236038 A1 * | 8/2019 | Choudhary | G06F 13/4027 | |
| 2020/0004690 A1 * | 1/2020 | Mathew | G06F 3/0608 | |
| 2020/0097214 A1 * | 3/2020 | Zheng | G06F 3/061 | |

FOREIGN PATENT DOCUMENTS

| | | |
|---|---|---|
| JP | 2019-79522 A | 5/2019 |
| JP | 2019-79525 A | 5/2019 |
| JP | 2019-79526 A | 5/2019 |
| JP | 2019-79528 A | 5/2019 |
| JP | 2019-79529 A | 5/2019 |
| JP | 2019-79527 A | 5/2020 |

OTHER PUBLICATIONS

Liang, J. An Architecture and Compiler for Scalable On-Chip Communication. IEEE Transactions on VLSI Systems, vol. 12, No. 7, Jul. 2004, pp. 711-726, [retrieved on Jul. 27, 2020], Retrieved from the Internet <URL: https://ieeexplore.ieee.org/stamp/stamp.jsp?tp=&arnumber= 1308206 > <DOI: 10.1109/TVLSI.2004.830919>.*

Agarwal, A. et al. The Raw Compiler Project., ]. May 1999, pp. 1-12, [retrieved on Jul. 27, 2020Retrieved from the Internet <URL: https://pdfs.semanticscholar.org/d916/86d774b0a2763f2c75d1d5090ec4e27b31f4.pdf>.*

Schoeberl, M. A Time-Triggered Network-on-Chip. 2007 IC on Field Programmable Logic and Applications . Aug. 2007, pp. 377-382, [retrieved on Jul. 27, 2020], Retrieved from the Internet <URL: https://ieeexplore.ieee.org/stamp/stamp.jsp?tp=&arnumber= 4380675> <DOI: 10.1109/FPL.2007.4380675>.*

Vangal, SR et al. An 80-Tile Sub-100-W TeraFLOPS Processor in 65-nm CMOS. IEEE J. of Solid-State Circuits, vol. 43, No. 1, Jan. 2008, pp. 29-41 [online], [retrieved on Jul. 27, 2020], Retrieved from the Internet <URL: https://ieeexplore.ieee.org/stamp/stamp.jsp?tp=&arnumber=4443212 > <DOI: 10.1109/JSSC.2007.910957>.*

Xu, G. et al. A Wire Delay Scalable Stream Processor Architecture. 13th Asia-Pacific Computer Systems Architecture Conf., Aug. 2008, pp. 1-8, [retrieved on Jul. 27, 2020], Retrieved from the Internet <URL: https://ieeexplore.ieee.org/stamp/stamp.jsp?tp=& arnumber= 4625468> <DOI: 10.1109/APCSAC.2008.4625468>.*

Office Action dated May 11, 2020 for Canadian Patent Application No. 3,041,881.

Combined Search and Examination Report for GB Patent Application No. GB1821132.6 dated Oct. 9, 2019. 5 pages.

(56) References Cited

OTHER PUBLICATIONS

Office Action for Japanese Patent Application No. 2019-119234. dated Sep. 15, 2019. 6 pages.

* cited by examiner

SEND

PUTi - MUXptr

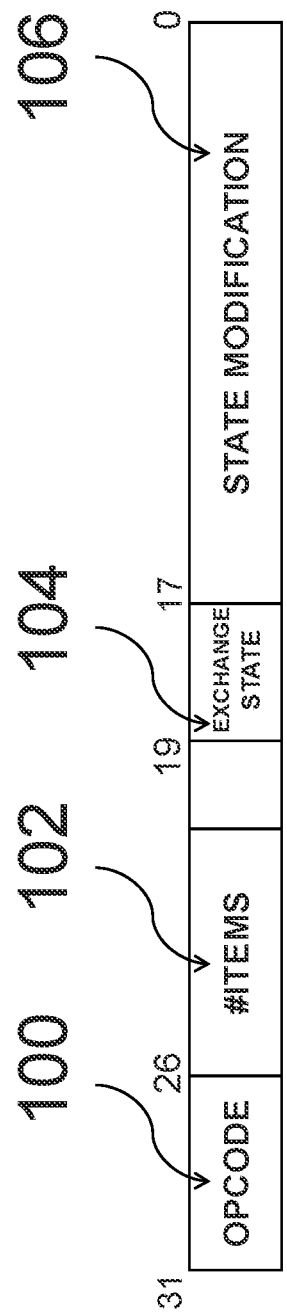
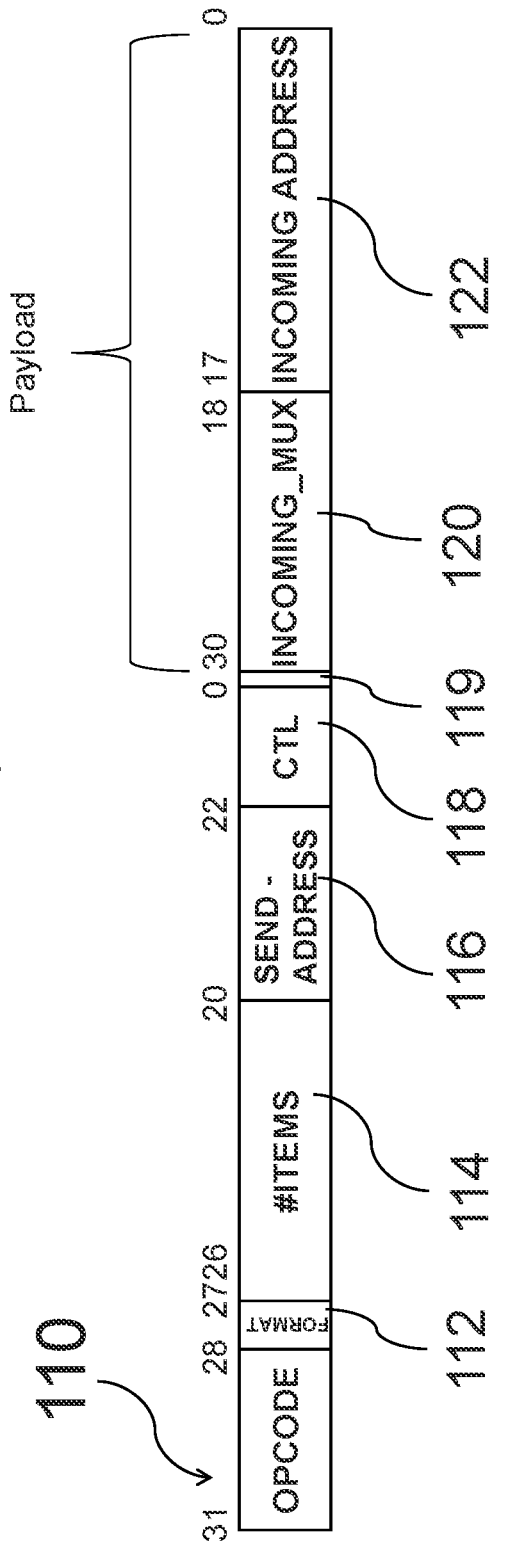
FIG. 10
FIG. 11

| 10 | 9 | 8 | 7 | 6 | 5 | 4 | 3 | 2 | 1 | 0 |
|---|---|---|---|---|---|---|---|---|---|---|
| Supertile_id[4:0] | | | | | column_id[3:0] | | | | tile_sub_id[1:0] | |

FIG. 16

| Columns | Column base compensation delays; number of stages. | | |
|---|---|---|---|
| | tile to exchange data [36 bits/tile] | exchange mux control [12 bits/tile] | exchange to tile [35 bits/tile] |
| 0, 8 | 3 | 0 | 7 |
| 1, 9 | 3 | 1 | 6 |
| 2, 10 | 2 | 2 | 5 |
| 3, 11 | 2 | 3 | 4 |
| 4, 12 | 1 | 4 | 3 |
| 5, 13 | 1 | 5 | 2 |
| 6, 14 | 0 | 6 | 1 |
| 7, 15 | 0 | 7 | 0 |

FIG. 17

| Sending tile ID | 1186 |
|---|---|
| Receiving tile ID | 1153 |
| | cycles |
| SEND to exchange output delay | 8 |
| Tile to column base delay | 21 |
| Column base compensation delay | 3 |
| Column base to exchange bus delay | 2 |
| easterly delay along exchange | -43 |
| exchange bus to column base delay | 16 |
| Column base compensation delay | 7 |
| Column base to tile delay | 21 |
| minimum exchange input to dependent LD delay | 1 |
| BNET_TT(1186,1153) | 122 |
| BNET_EAST(1186,1153) | WEST |

FIG. 18

| compiled group | 3 Other groups | | | |
|---|---|---|---|---|
| <u>12</u> | <u>1</u> | <u>4</u> | <u>9</u> | << compiled and modified column_ids from each group of columns (must be from the *same position* in each group). |
| 0 | 11 | 8 | 3 | << $COLUMN_OFFSET[3:0] calculated from reference column ids. |
| <u>12</u> <u>13</u> <u>0</u> | 1 2 11 | 4 5 8 | 9 10 3 | Modified column IDs |
| 0 | 1 | 1 | 0 | << $COLUMN_OFFSET[4] (reverse E/W directionality of non-multicast SENDs) |

FIG. 19A

| compiled group | 7 Other groups | | | | | | | |
|---|---|---|---|---|---|---|---|---|
| 10 | 12 | 14 | 0 | 2 | 4 | 6 | 8 | << compiled and modified column_ids from each group of columns (must be from the *same position* in each group). |
| 0 | 14 | 12 | 10 | 8 | 6 | 4 | 2 | << $COLUMN_OFFSET[3:0] calculated from reference column ids. |
| 10 | 12 | 14 | 0 | 2 | 4 | 6 | 8 | Modified column IDs |
| 11 | 13 | 15 | 1 | 3 | 5 | 7 | 9 | |
| 0 | 0 | 0 | 1 | 1 | 1 | 1 | 0 | << $COLUMN_OFFSET[4] (reverse E/W directionality of non-multicast SENDs) |

FIG. 20A

DATA EXCHANGE PATHWAYS BETWEEN PAIRS OF PROCESSING UNITS IN COLUMNS IN A COMPUTER

CROSS-REFERENCE TO RELATED APPLICATIONS

This application claims the priority benefit under 35 U.S.C. § 119 of United Kingdom Patent Application No. 1821132.6, filed Dec. 21, 2018, the entire contents of which are incorporated herein by reference.

TECHNICAL FIELD

The present disclosure relates to data exchange in a computer. In particular, the disclosure relates to a computer with multiple processing units, in which data is exchanged between the processing units via exchange pathways between transmitting and recipient processing units. Particularly but not exclusively, the disclosure relates to a computer which operates a bulk synchronous parallel (BSP) computing protocol whereby each group of processing units must complete a compute phase before any of the processing units in the group can proceed to an exchange phase, in which data is exchanged over the exchange pathways.

BACKGROUND

Parallelism in computing takes different forms. Program fragments may be organised to execute concurrently (where they overlap in time but may share execution resources) or in parallel where they execute on different resources possibly at the same time.

Parallelism in computing can be achieved in a number of ways, such as by means of an array of multiple interconnected processor tiles, or a multi-threaded processing unit, or indeed a multi-tile array in which each tile comprises a multi-threaded processing unit.

When parallelism is achieved by means of a processor comprising an array of multiple tiles on the same chip (or chips in the same integrated circuit package), each tile comprises its own separate respective processing unit with local memory (including program memory and data memory). Thus separate portions of program code can be run concurrently on different tiles. The tiles are connected together via an on-chip interconnect which enables the code run on the different tiles to communicate between tiles. In some cases the processing unit on each tile may take the form of a barrel-threaded processing unit (or other multi-threaded processing unit). Each tile may have a set of contexts and an execution pipeline such that each tile can run multiple interleaved threads concurrently.

In general, there may exist dependencies between the portions of a program running on different tiles in the array. A technique is therefore required to prevent a piece of code on one tile running ahead of data upon which it is dependent being made available by another piece of code on another tile. There are a number of possible schemes for achieving this, but the scheme of interest herein is known as "bulk synchronous parallel" (BSP). According to BSP, each tile performs a compute phase and an exchange phase in an alternating manner. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet begin a new compute phase until that tile has finished its exchange phase. Further, according to this form of BSP principle, a barrier synchronization is placed at the juncture transitioning from the compute phase into the exchange phase, or transitioning from the exchange phases into the compute phase, or both. That is it say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. When used herein the phrase "between a compute phase and an exchange phase" encompasses all these options.

An example use of multi-threaded and/or multi-tiled parallel processing is found in machine intelligence. As will be familiar to those skilled in the art of machine intelligence, machine intelligence algorithms are capable of producing knowledge models and using the knowledge model to run learning and inference algorithms. A machine intelligence model incorporating the knowledge model and algorithms can be represented as a graph of multiple interconnected nodes. Each node represents a function of its inputs. Some nodes receive the inputs to the graph and some receive inputs from one or more other nodes. The output activation of some nodes form the inputs of other nodes, and the output of some nodes provide the output of the graph, and the inputs to the graph provide the inputs to some nodes. Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs, or other introspective forms of analysis can be performed on it.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose opportunities for huge parallelism.

SUMMARY

A highly distributed parallel machine is a suitable machine structure for computation of such machine intelligence models.

A factor of knowledge models which is exploited in the present disclosure is the generally static nature of the graph. That is to say that the structure of the nodes and the graph comprising the nodes does not usually change during execution of machine intelligence algorithms. The inventors have made a machine which makes certain time deterministic guarantees to optimise computation on machine intelligence models. This allows a compiler to partition and schedule work across the nodes in a time deterministic fashion. It is this time determinism which is utilised in following described embodiments for significant optimisations in code utilisation in a computer optimised to process workloads based on knowledge models.

An aspect of the present invention provides a computer comprising:
- a plurality of processing units each having an input interface with a set of input wires, and an output interface with a set of output wires;
- a switching fabric connected to each of the processing units by the respective set of output wires and connectable to each of the processing units by the respective set of output wires and connectable to each of the processing units by the respective input wires via switching circuitry controllable by its associated processing unit;
- the processing units arranged in columns, each column having a base processing unit proximate the switching fabric and multiple processing units one adjacent the other in respective positions in the direction of the column, wherein to implement exchange of data between the processing units at least one processing unit is configured to transmit at a transmit time a data packet intended for a recipient processing unit onto its output set of connection wires, the data packet having no destination identifier of the recipient processing unit but destined for receipt at the recipient processing unit with a predetermined delay relative to the transmit time, wherein the predetermined delay is dependent on an exchange pathway between the transmitting and recipient processing units, wherein the exchange pathway between any pair of transmitting and recipient processing unit at respective positions in one column has the same delay as the exchange pathway between each pair of transmitting and recipient processing units at corresponding respective positions in the other columns.

The physical exchange pathway can include a pathway component which extends from a respective processing unit in the column to the base of the column.

The switching fabric may comprise a plurality of groups of exchange wires, each group having wires connected to the output wires of processing units in each respective column.

In one embodiment a first one of the columns is spaced from its respective group of wires by a first physical distance, and a second one of the columns is spaced from its corresponding group of wires by a second physical distance, wherein the second physical distance is greater than the first physical distance. A compensation delay may be provided in a column to switching fabric path component between the first column and the corresponding first group of wires, whereby the column to switching fabric path delay of the first column is the same as the column to switching fabric path delay of the second column.

The compensation delay may comprise an output compensation delay circuit arranged in the output set of connection wires of each processing unit in the first column.

The compensation delay may additionally or alternatively comprise an input compensation delay circuit arranged in the set of input wires for each tile in the first column.

The computer can further comprise a switching compensation delay in a switching control set of wires which extends from each processing unit to its corresponding switching circuitry, the switching delay compensation being determined so that the sum of the input delay compensation circuit and the switching control delay compensation is the same for each column.

In some embodiments the switching fabric extends in a first direction, and each column extends in a second direction perpendicular to the first direction.

The computer may comprise n columns located on one side of the switching fabric and n columns located on the other side of the switching fabric and extending away from the switching fabric in a reverse direction. In one architecture n is 8.

Each of the n columns located on the first side of the switching fabric may be associated with respective groups of wires in a first half of the switching fabric, and each of the n columns located on the other side of the switching fabric may be associated with respective groups of wires in the other half of the switching fabric.

The exchange pathway may comprise a column base to tile path component based on the distance along the column of the respective processing unit from the base processing unit.

Each processing unit can be configured to have instruction storage holding a local program including exchange code, an execution unit configured to execute the local program and data storage for holding data, wherein the exchange code of a processing unit at a first position in one of the columns is the same as the exchange code of a processing unit in the same respective position of another column.

In some embodiments the exchange code comprises a SEND instruction which causes the data packet to be transmitted at the transmit time to a recipient processing unit in the same column.

The computer can comprise a synchronisation module operable to generate a synchronisation signal to control the computer to switch between a compute phase and an exchange phase, wherein the processing units are configured to execute their local programs according to a common clock, the local programs being such that the at least one processing unit is configured to transmit the data packet in the exchange phase.

The synchronisation signal may be received at each column via a respective synchronisation delay stage such that the synchronisation signal is received at each processing unit in the computer at the same time. This may be useful when relocating exchange code generated for n group of columns to another, similar group with the opposite "pole" (North or South). An alternative approach to achieve a delay in the synchronisation signal is to add delay instructions just before the exchange code.

By ensuring that the exchange pathway has the same latency for respectively positioned processing units in any column, the same exchange code can be used for similar intra-column exchanges in any column. In this context, exchange code comprises the sequence of instructions which cause data to be transmitted from a processing unit, and which manage the receiving of data at a recipient processing unit. These instructions include a SEND instruction at the transmitting tile, and a control instruction for the switching circuitry at the recipient tile. In addition, there may be a memory pointer instruction at the recipient tile. This memory pointer instruction does not actually instruct a load into memory (that occurs without an explicit instruction), but may set the address in memory that the data is to be loaded into on receipt.

In addition, further delay compensation can be introduced to enable the same exchange code to be used for some inter-column data exchanges. It is possible to select a set of delay compensations for the different path components in such a manner that certain combinations of sending and receiving tiles in the computer exhibit the same latency over their exchange pathways.

Note the challenge here—exchange code for tiles in a column is compiled to understand latencies between the transmitting tile and each recipient tile for each message. The same code can only be used in other intra or inter column exchanges if the latencies are the same for corresponding tile pairs. In this context "corresponding" means correspondingly positioned tiles in other columns.

In one arrangement, a switching fabric extends across a chip in which the computer is embodied, and a set of columns is arranged side by side extending perpendicularly from one side of the switching fabric, and another set of columns is arranged side by side extending perpendicularly (but in a reverse direction) from the other side of the column. In such a way, an array of columns is formed. For ease of reference, columns on one side of the switching fabric are referred to us being in the northern part of the array (northern columns), and columns on the other side of the fabric are referred to as being in the southern part of the array (southern columns). It is possible to introduce delay compensation such that processing units in respective positions in certain pairs of columns on either the northern or the southern part of the array can utilise the same exchange code.

In another example, when a transmitting processing unit is in a column in the northern part of the array, and the recipient processing unit is in a column in the southern part of the array (or vice versa) some column pairs may share the same exchange code, through the use of delay compensation.

BRIEF DESCRIPTION OF THE DRAWINGS

For a better understanding of the present invention and to show how the same may be carried into effect reference will now be made by way of example to the following drawings.

FIGS. 8 to 11 illustrate instruction formats of different instructions usable in a time deterministic architecture;

FIG. 16 shows the bits in a tile identifier;

FIG. 17 is a table showing an example of one set of compensation delays;

FIG. 18 is a table showing one example of a tile to tile delay.

FIGS. 19 and 19A show example of reuse of the exchange code; and

FIGS. 20 and 20A show another example of reuse of exchange code.

DETAILED DESCRIPTION OF THE EMBODIMENTS

Figure 1:
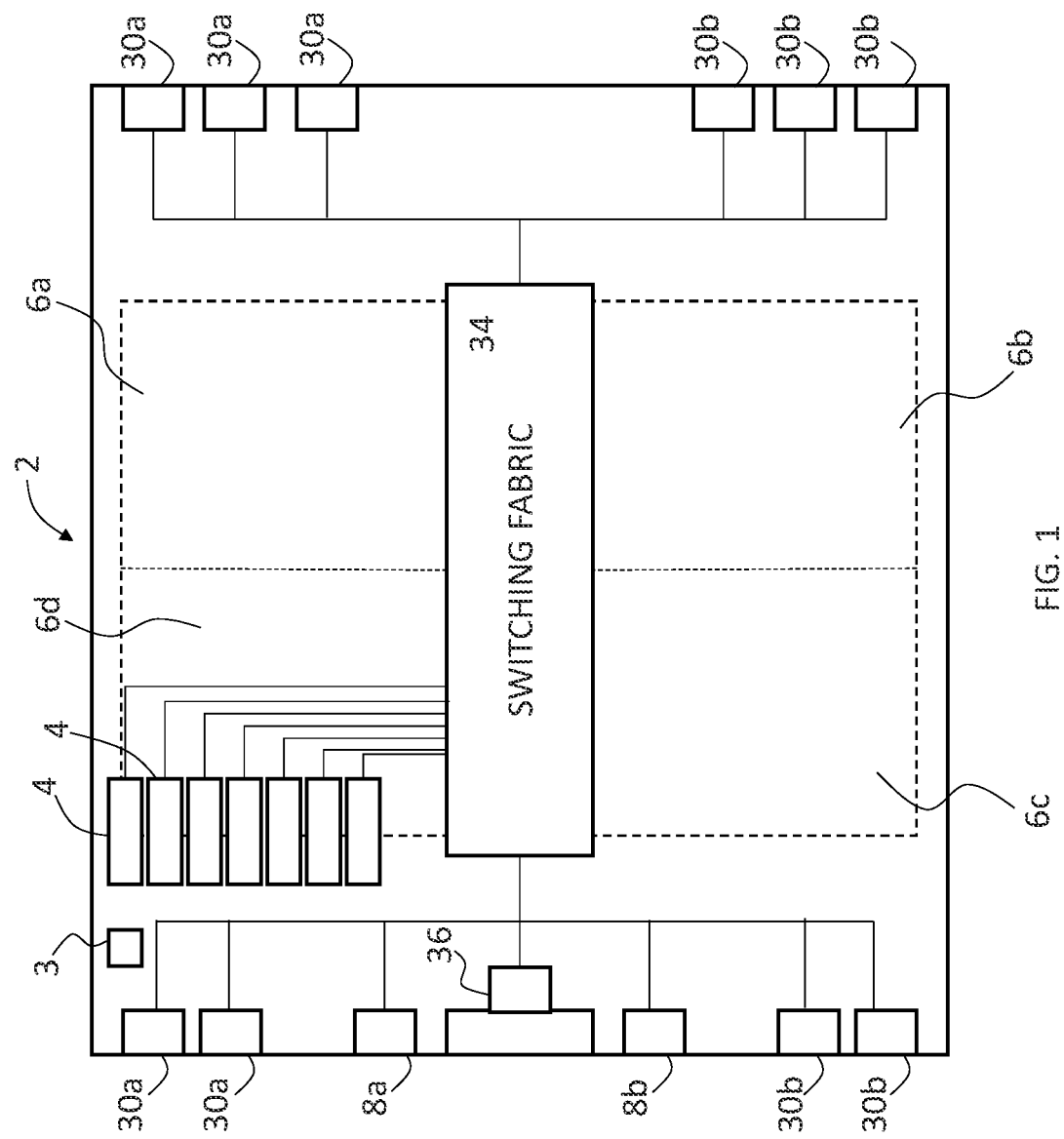
FIG. 1 illustrates schematically the architecture of a single chip processor.

The present disclosure sets out a delay compensation mechanism that can be utilised to enable common exchange code to be used in multiple parts of a time deterministic processor. FIG. 1 illustrates schematically the architecture of a single chip processor 2. The processor is referred to herein as an IPU (Intelligence Processing Unit) to denote its adaptivity to machine intelligence applications. In a computer, the single chip processors can be connected together as discussed later, using links on the chip, to form a computer. The present description focuses on the architecture of the single chip processor 2. The processor 2 comprises multiple processing units referred to as tiles. In one embodiment, there are 1216 tiles organised in arrays 6*a*, 6*b*, 6*c*, and 6*d*. The processor can be considered as having East and West regions, and North and South regions. 6*a* may be referred to as "North East array", 6*b* may be referred to as "South East array", 6*c* may be referred to as "South West array", and 6*d* may be referred to as "North West array" In the described example, each array has four columns of 76 tiles (in fact generally there will be 80 tiles, for redundancy purposes). It will be appreciated that the concepts described herein extend to a number of different physical architectures—one example is given here to aid understanding. The chip 2 has two chip to host links 8*a*, 8*b* and 4 chip to chip links 30*a*, 30*b* arranged on the "West" edge of the chip 2. The chip 2 receives work from a host (not shown) which is connected to the chip via one of the card-to-host links in the form of input data to be processed by the chip 2. The chips can be connected together into cards by a further 6 chip-to-chip links 30*a*, 30*b* arranged along the "East" side of the chip. A host may access a computer which is architected as a single chip processor 2 as described herein or a group of multiple interconnected single chip processors 2 depending on the workload from the host application.

The chip 2 has a clock 3 which controls the timing of chip activity. The clock is connected to all of the chip's circuits and components. The chip 2 comprises a time deterministic switching fabric 34 to which all tiles and links are connected by sets of connection wires, the switching fabric being stateless, i.e. having no program visible state. Each set of connection wires is fixed end to end. The wires are pipelined. In this embodiment, a set comprises 32 data wires plus control wires, e.g. a valid bit. Each set can carry a 32-bit data packet, but note herein that the word "packet" denotes a set of bits representing a datum (sometimes referred to herein as a data item), perhaps with one or more valid bit. The "packets" do not have headers with destination identifiers which permit an intended recipient to be uniquely identified, nor do they have end-of-packet information. Instead, they each represent a numerical or logical value input to or output from a tile. The packets may include headers indicating at least one direction of travel through the switching fabric 34, however. Each tile has its own local memory (described later). The tiles do not share memory. The switching fabric constitutes a cross set of connection wires only connected to multiplexers and tiles as described later and does not hold any program visible state. The switching fabric is considered to be stateless and does not use any memory. Data exchange between tiles is conducted on a time deterministic basis as described herein. A pipelined connection wire comprises a series of temporary stores, e.g. latches or flip flops which hold datum for a clock cycle before releasing it to the next store. Time of travel along the wire is determined by these temporary stores, each one using up a clock cycle of time in a path between any two points.

Figure 2:
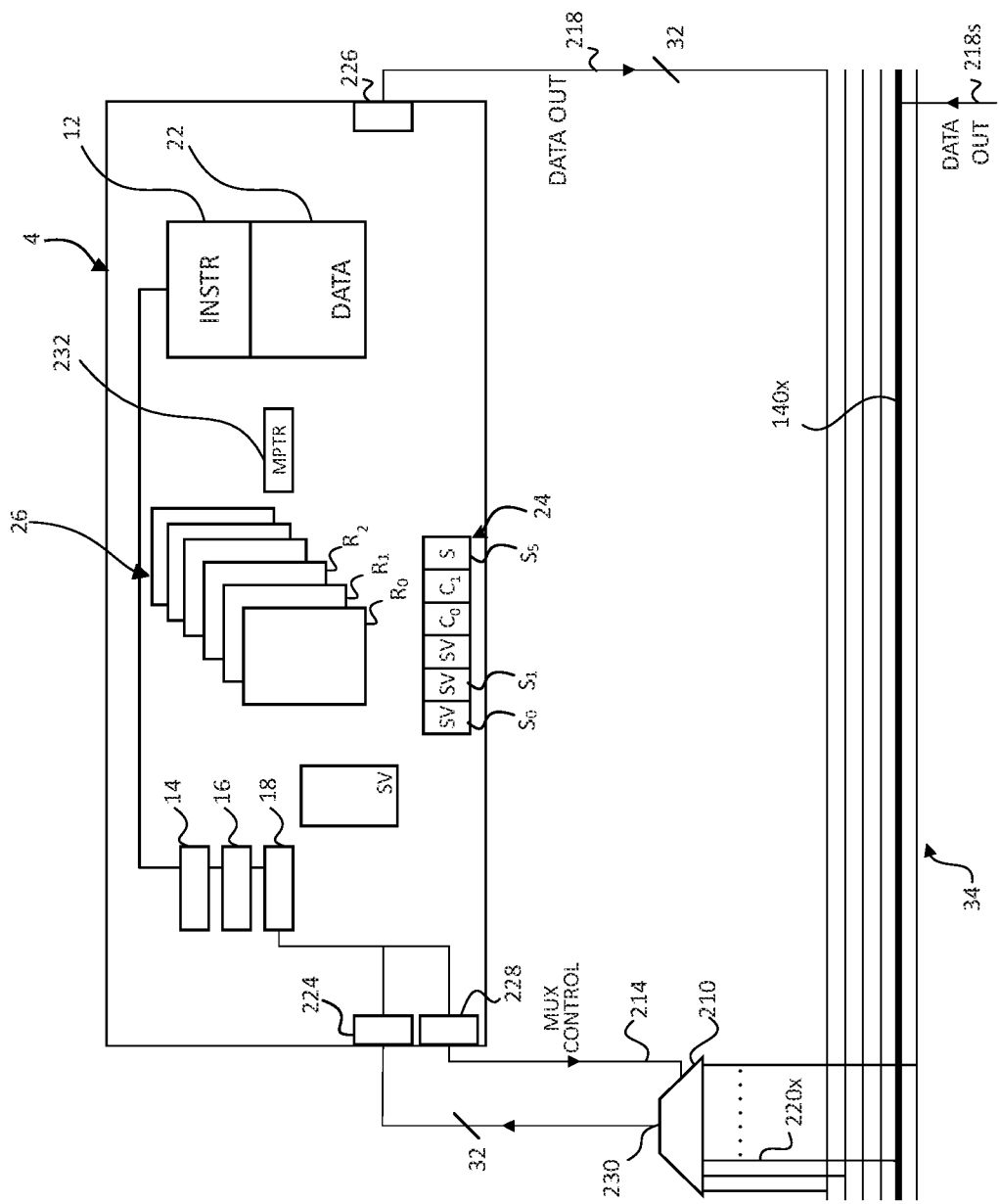
FIG. 2 is a schematic diagram of a tile connected to the switching fabric.

Each column is associated with a respective group of exchange wires as described later. Columns using groups of wires physically closer to them have lower latencies for inter-column exchanges than a column using a group of wires which is located further away. FIG. 2 illustrates an example tile 4 in accordance with embodiments of the present disclosure. In the tile, multiple threads are interleaved through a single execution pipeline. The tile 4 comprises: a plurality of contexts 26 each arranged to represent the state of a different respective one of a plurality of threads; a shared instruction memory 12 common to the plurality of threads; a shared data memory 22 that is also common to the plurality of threads; a shared execution pipeline 14, 16, 18 that is again common to the plurality of threads; and a thread scheduler 24 for scheduling the plurality of threads for execution through the shared pipeline in an interleaved manner. The thread scheduler 24 is schematically represented in the diagram by sequence of time slots $S_0 \ldots S_5$, but in practice is a hardware mechanism managing program counters of the threads in relation to their time slots. The execution pipeline comprises a fetch stage 14, a decode stage 16, and an execution stage 18 comprising an execution unit (EXU) and a load/store unit (LSU). Each of the contexts 26 comprises a respective set of registers $R_0$, $R_1 \ldots$ for representing the program state of the respective thread.

The fetch stage 14 is connected to fetch instructions to be executed from the instruction memory 12, under control of the thread scheduler 24. The thread scheduler 24 is configured to control the fetch stage 14 to fetch instructions from the local program for execution in each time slot as will be discussed in more detail below.

The fetch stage 14 has access to a program counter (PC) of each of the threads that is currently allocated to a time slot. For a given thread, the fetch stage 14 fetches the next instruction of that thread from the next address in the instruction memory 12 as indicated by the thread's program counter. Note that an instruction as referred to herein, means a machine code instruction, i.e. an instance of one of the fundamental instructions of the computer's instruction set, made up of an opcode and zero or more operands. Note too that the program loaded into each tile is determined by a processor or compiler to allocate work based on the graph of the machine intelligence model being supported.

The fetch stage 14 then passes the fetched instruction to the decode stage 16 to be decoded, and the decode stage 16 then passes an indication of the decoded instruction to the execution stage 18 along with the decoded addresses of any operand registers of the current context specified in the instruction, in order for the instruction to be executed.

In the present example, the thread scheduler 24 interleaves threads according to a round-robin scheme whereby, within each round of the scheme, the round is divided into a sequence of time slots $S_0$, $S_1$, $S_2$, $S_3$, each for executing a respective thread. Typically each slot is one processor cycle long and the different slots are evenly sized (though not necessarily so in all possible embodiments). This pattern then repeats, each round comprising a respective instance of each of the time slots (in embodiments in the same order each time, though again not necessarily so in all possible embodiments). Note therefore that a time slot as referred to herein means the repeating allocated place in the sequence, not a particular instance of the time slot in a given repetition of the sequence. In the illustrated embodiment, there are eight time slots, but other numbers are possible. Each time slot is associated with hardware resource, e.g. register, for managing the context of an executing thread.

One of the contexts 26, labelled SV, is reserved for a special function, to represent the state of a "supervisor" (SV) whose job it is to coordinate the execution of "worker" threads. The supervisor can be implemented as a program organised as one or more supervisor threads which may run concurrently. The supervisor thread may also be responsible for performing barrier synchronisations described later or may be responsible for exchanging data on and off the tile, as well as in and out of local memory so that is can be shared between the worker threads between computations. The supervisor thread implements exchange code, which is the instructions involved in exchanging data on and off the tile. The thread scheduler 24 is configured so as, when the program as a whole starts, to begin by allocating the supervisor thread to all of the time slots, i.e. so the supervisor SV starts out running in all time slots $S_0 \ldots S_5$. However, the supervisor thread is provided with a mechanism for, at some subsequent point (either straight away or after performing one or more supervisor tasks), temporarily relinquishing each of the slots in which it is running to a respective one of the worker threads $C_0$, $C_1$ denote slots to which a worker thread has been allocated. This is achieved by the supervisor thread executing a relinquish instruction, called "RUN" by way of example herein. In embodiments this instruction takes two operands: an address of a worker thread in the instruction memory 12 and an address of some data for that thread in the data memory 22:

RUN task_addr, data_addr

Each worker thread is a codelet intended to represent a vertex in the graph and to execute atomically. That is all the data it consumes is available at launch and all the data it produces is not visible to other threads until it exits. It runs to completion (excepting error conditions).The data address may specify some data to be acted upon by the codelet. Alternatively, the relinquish instruction may take only a single operand specifying the address of the codelet, and the data address could be included in the code of the codelet; or the single operand could point to a data structure specifying the addresses of the codelet and data. Codelets may be run concurrently and independently of one another.

Either way, this relinquish instruction ("RUN") acts on the thread scheduler 24 so as to relinquish the current time slot, i.e. the time slot in which this instruction is executed, to the worker thread specified by the operand. Note that it is implicit in the relinquish instruction that it is the time slot in which this instruction is executed that is being relinquished (implicit in the context of machine code instructions means it doesn't need an operand to specify this—it is understood implicitly from the opcode itself). Thus the slot which is given away is the slot which the supervisor executes the relinquish instruction in. Or put another way, the supervisor is executing in the same space that it gives away. The supervisor says "run this codelet at this time slot", and then from that point onwards the slot is owned (temporarily) by the relevant worker thread. Note that when a supervisor uses a slot it does not use the context associated with that slot but uses its own context SV.

The supervisor thread SV performs a similar operation in each of the time slots, to give away all its slots $C_0$, $C_1$ to different respective ones of the worker threads. Once it has done so for the last slot, the supervisor pauses execution, because it has no slots in which to execute. Note that the supervisor may not give away all its slots, it may retain some for running itself.

When the supervisor thread determines it is time to run a codelet, it uses the relinquish instruction ("RUN") to allocate this codelet to the slot in which it executes the 'RUN' instruction.

Each of the worker threads in slots $C_0$, $C_1$ proceeds to perform its one or more computation tasks. At the end of its task(s), the worker thread then hands the time slot in which it is running back to the supervisor thread.

This is achieved by the worker thread executing an exit instruction ("EXIT"). In one embodiment, the EXIT instruction takes at least one operand and preferably only a single operand, exit state (e.g. a binary value), to be used for any purpose desired by the programmer to indicate a state of the respective codelet upon ending.

EXIT exit_state

In one embodiment, the EXIT instruction acts on the scheduler 24 so that the time slot in which it is executed is returned back to the supervisor thread. The supervisor thread can then perform one or more subsequent supervisor tasks (e.g. barrier synchronization and/or movement of data in memory to facilitate the exchange of data between worker threads), and/or continue to execute another relinquish instruction to allocate a new worker thread (W4, etc.) to the slot in question. Note again therefore that the total number of threads in the instruction memory 12 may be greater than the number that barrel-threaded processing unit 10 can interleave at any one time. It is the role of the supervisor thread SV to schedule which of the worker threads W0 . . . Wj from the instruction memory 12, at which stage in the overall program, are to be executed.

In another embodiment, the EXIT instruction does not need to define an exit state.

This instruction acts on the thread scheduler 24 so that the time slot in which it is executed is returned back to the supervisor thread. The supervisor thread can then perform one or more supervisor subsequent tasks (e.g. barrier synchronization and/or exchange of data), and/or continue to execute another relinquish instruction, and so forth.

Figure 3:
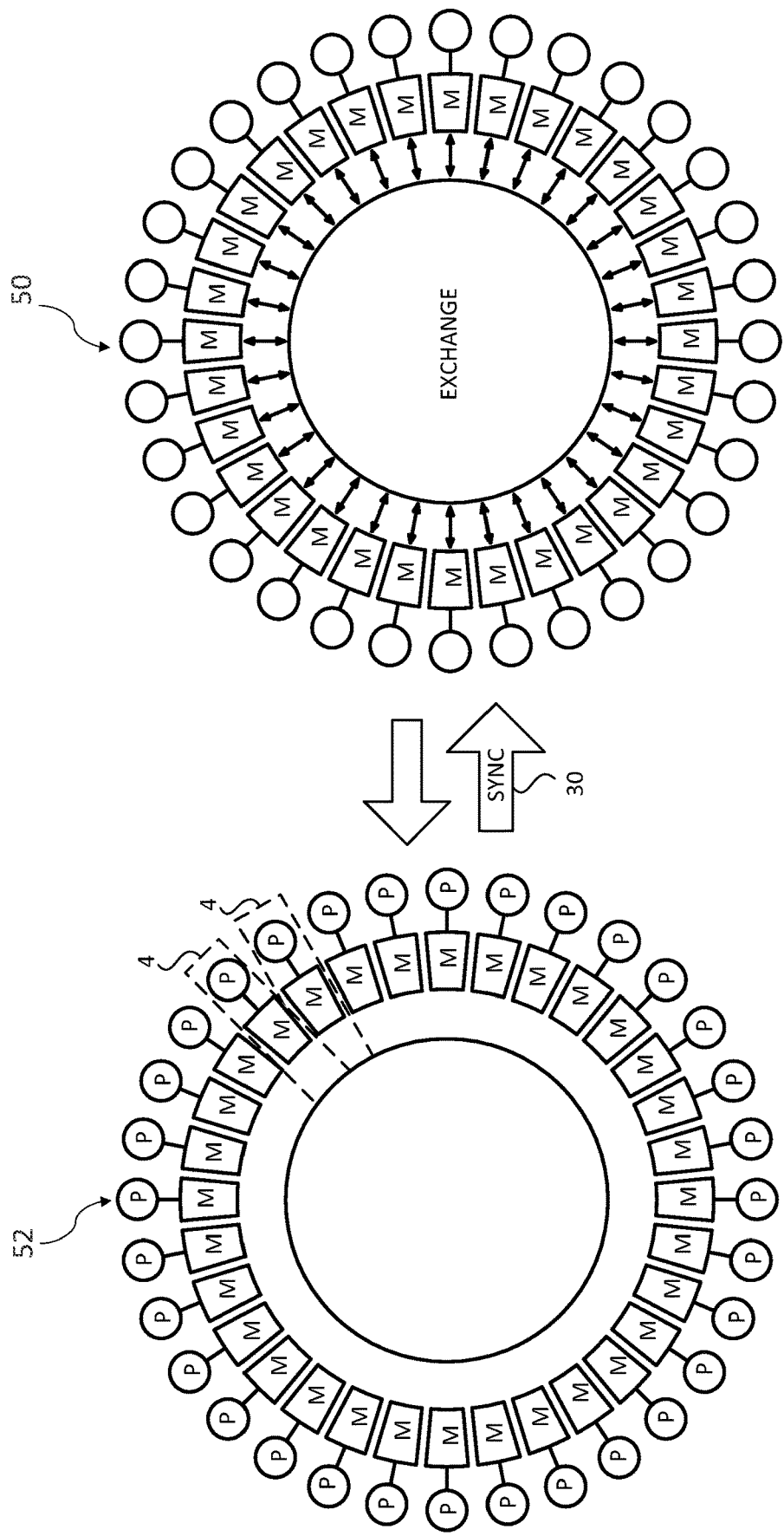
FIG. 3 is a diagram illustrating a BSP protocol.

As briefly mentioned above, data is exchanged between tiles in the chip. Each chip operates a Bulk Synchronous Parallel protocol, comprising a compute phase and an exchange phase. The protocol is illustrated for example in FIG. 3. The left-hand diagram in FIG. 3 represents a compute phase in which each tile 4 is in a phase where the stateful codelets execute on local memory (12, 22). Although in FIG. 3 the tiles 4 are shown arranged in a circle this is for explanatory purposes only and does not reflect the actual architecture.

After the compute phase, there is a synchronisation denoted by arrow 30. To achieve this, a SYNC (synchronization) instruction is provided in the processor's instruction set. The SYNC instruction has the effect of causing the supervisor thread SV to wait until all currently executing workers W have exited by means of an EXIT instruction. In embodiments the SYNC instruction takes a mode as an operand (in embodiments its only operand), the mode specifying whether the SYNC is to act only locally in relation to only those worker threads running locally on the same processor module 4, e.g. same tile, or whether instead it is to apply across multiple tiles or even across multiple chips.

SYNC mode//mode $\in$ {tile, chip, zone_1, zone_2}

BSP in itself is known in the art. According to BSP, each tile 4 performs a compute phase 52 and an exchange (sometimes called communication or message-passing) phase 50 in an alternating cycle. The compute phase and exchange phase are performed by the tile executing instructions. During the compute phase 52 each tile 4 performs one or more computation tasks locally on-tile, but does not communicate any results of these computations with any others of the tiles 4. In the exchange phase 50 each tile 4 is allowed to exchange (communicate) one or more results of the computations from the preceding compute phase to and/or from one or more others of the tiles in the group, but does not yet perform any new computations that have a potential dependency on a task performed on another tile 4 or upon which a task on another tile 4 might potentially have a dependency (it is not excluded that other operations such as internal control-related operations may be performed in the exchange phase). Further, according to the BSP principle, a barrier synchronization is placed at the juncture transitioning from the compute phases 52 into the exchange phase 50, or the juncture transitioning from the exchange phases 50 into the compute phase 52, or both. That is it say, either: (a) all tiles 4 are required to complete their respective compute phases 52 before any in the group is allowed to proceed to the next exchange phase 50, or (b) all tiles 4 in the group are required to complete their respective exchange phases 50 before any tile in the group is allowed to proceed to the next compute phase 52, or (c) both of these conditions is enforced. This sequence of exchange and compute phases may then repeat over multiple repetitions. In BSP terminology, each repetition of exchange phase and compute phase is referred to herein as a "superstep", consistent with usage in some prior descriptions of BSP. It is noted herein that the term "superstep" is sometimes used in the art to denote each of the exchange phase and compute phase.

The execution unit (EXU) of the execution stage 18 is configured so as, in response to the opcode of the SYNC instruction, when qualified by the on-chip (inter-tile) operand, to cause the supervisor thread in which the "SYNC chip" was executed to be paused until all the tiles 4 in the array 6 have finished running workers. This can be used to implement a barrier to the next BSP superstep, i.e. after all tiles 4 on the chip 2 have passed the barrier, the cross-tile program as a whole can progress to the next exchange phase 50.

Each tile indicates its synchronisation state to a sync module 36. Once it has been established that each tile is ready to send data, the synchronisation process 30 causes the system to enter an exchange phase which is shown on the right-hand side of FIG. 3. In this exchange phase, data values move between tiles (in fact between the memories of tiles in a memory-to-memory data movement). In the exchange phase, there are no computations which might induce concurrency hazards between tile programs. In the exchange phase, each datum moves along the connection wires on which it exits a tile from a transmitting tile to one or multiple recipient tile(s). At each clock cycle, datum moves a certain distance along its path (store to store), in a pipelined fashion. When a datum is issued from a tile, it is not issued with a header identifying a recipient tile (although the datum may include a header indicating at least one direction of travel through the switching fabric 34). Instead, the recipient tile knows that it will be expecting a datum from a certain transmitting tile at a certain time. Thus, the computer described herein is time deterministic. Each tile operates a program which has been allocated to it by the programmer or by a compiler exercise, where the programmer or the compiler function has knowledge of what will be transmitted by a particular tile at a certain time and what needs to be received by a recipient tile at a certain time. In order to achieve this, SEND instructions are included in the local programs executed by the processor on each tile, where the time of execution of the SEND instruction is predetermined relative to the timing of other instructions being executed on other tiles in the computer. This is described in more detail later, but firstly the mechanism by which a recipient tile can receive a datum at a predetermined time will be described. Each tile 4 is associated with its own multiplexer 210: thus, the chip has 1216 multiplexer. Each multiplexer has 1216 inputs, each input being 32-bits wide (plus optionally some control bits).Each input is connected to a respective set of connecting wires $140_{x\,in}$ the switching fabric 34. The connecting wires of the switching fabric are also connected to a data out set of connection wires 218 from each tile (a broadcast exchange bus, described later), thus there are 1216 sets of connecting wires which in this embodiment extend in a direction across the chip. For ease of illustration, a single emboldened set of wires $140_{sc}$ is shown connected to the data out wires $218_s$, coming from a tile not shown in FIG. 2, in the south array 6b. This set of wires is labelled $140_x$ to indicate that it is one of a number of sets of crosswires $140_0$-$140_{1215}$. As can now be seen from FIG. 2, it will be appreciated that when the multiplexer 210 is switched to the input labelled $220_x$ then that will connect to the crosswires $140_x$ and thus to the data out wires $218_s$ of the tile (not shown in FIG. 2) from the south array 6b. If the multiplexer is controlled to switch to that input ($220_{sc}$) at a certain time, then the datum received on the data out wires which is connected to the set of connecting wire $140_x$ will appear at the output 230 of the multiplexer 210 at a certain time. It will arrive at the tile 4 a certain delay after that, the delay depending on the distance of the multiplexer from the tile. As the multiplexers form part of switching fabric, the delay from the tile to the multiplexer can vary depending on the location of the tile. To implement the switching, the local programs executed on the tiles include switch control instructions (PUTi) which cause a multiplexer control signal 214 to be issued to control the multiplexer associated with that tile to switch its input at a certain time ahead of the time at which a particular datum is expected to be received at the tile. In the exchange phase, multiplexers are switched and packets (data) are exchanged between tiles using the switching fabric. It is clear from this explanation that the switching fabric has no state—the movement of each datum is predetermined by the particular set of wires to which the input of each multiplexer is switched.

The SEND instruction comprises an indication of at least one direction in which a datum will travel along the switching fabric 34 from the transmitting tile to one or more receiving tiles. Data transmitted from a single Tile T to single T may travel in one of two fixed directions along the exchange fabric 34, with the direction dependent on the identifiers of these two communicating tile instances. The tile architecture describes exchange direction as observed by the sender and every send instruction uses a pair of configuration flags to indicate the direction of travel (East and/or West). It is functionally valid to set both the East-Valid and West-Valid flags for every executed SEND instruction (and indeed necessary when there are 2 or more recipient tiles and those recipients require a different transfer direction). However, in the cases where all recipient tiles are strictly to the East or West of the sending tile, setting only the relevant direction flag will enable the use of power optimisations.

Figure 13:
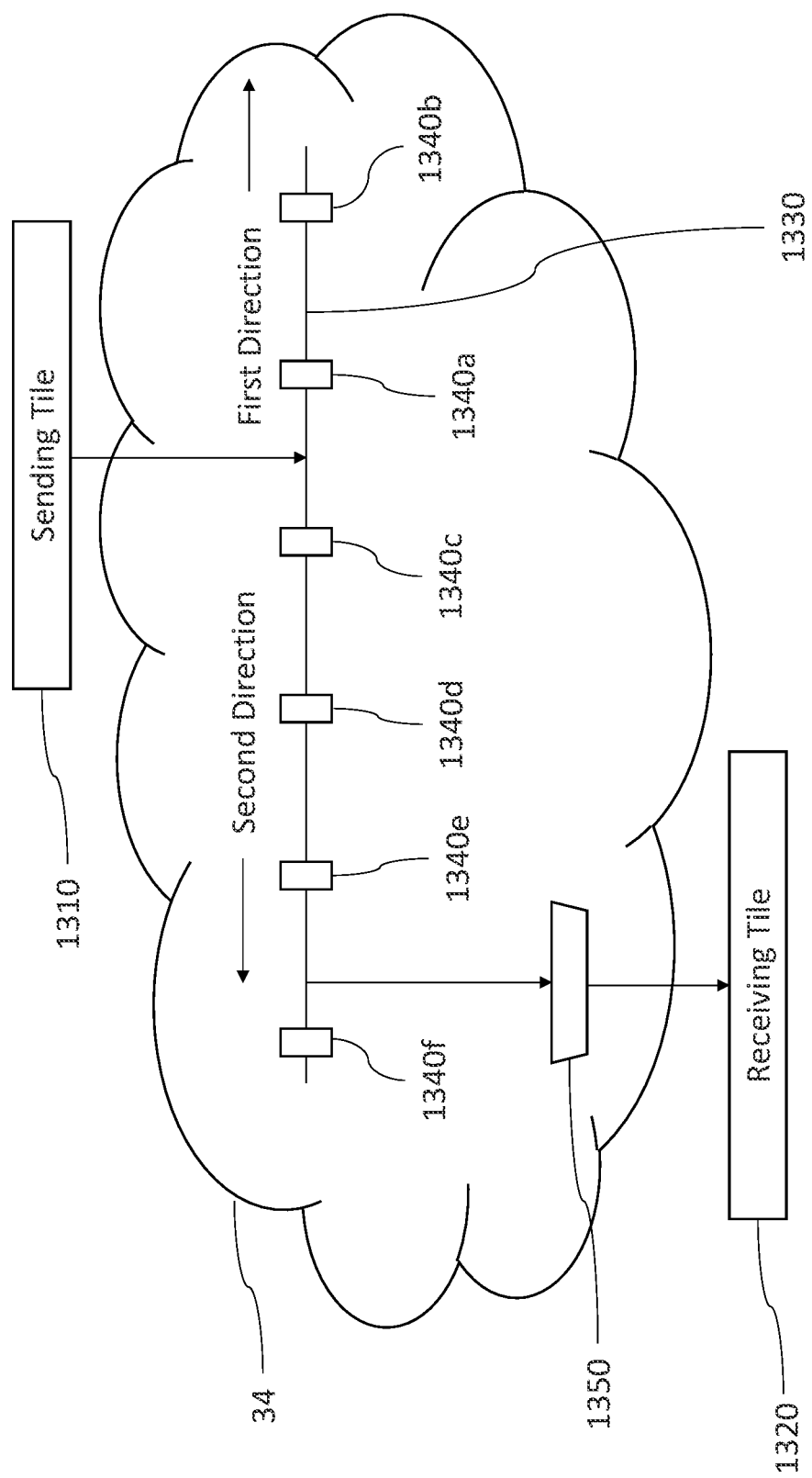
FIG. 13 illustrates an example of communication between two tiles over a switching fabric.

Reference is made to FIG. 13, which illustrates how the indication of at least one direction may be used to control the direction of travel of a datum through the switching fabric 34.

When the processor of the sending tile 1310 executes a send instruction, an indication of the at least one direction provided by the send instruction may be inserted into a datum for transmission onto the switching fabric. The indication may be inserted in a header of the datum. In this example, the receiving tile 1320 is shown as being located in a second direction from the sending tile 1310. Therefore, the indication of the at least one direction comprises an indication that the datum is to be transmitted in the second direction through the switching fabric 34. Since, in this example, there is no receiving tile positioned in the first direction along the switching fabric 34 from the sending tile 1310, the indication of the at least one direction comprises an indication that the datum is not to be transmitted in the first direction through the switching fabric 34.The processor of the transmitting tile 1310 may be configured to, in response to the execution of the send instruction, transmit at a transmit time, the datum onto a connection wire 1330 of the switching fabric 34. On the connection wire 1330, are a series of temporary stores 1340a, 1340b, 1340c, 1340d, 1340e, 1340f, e.g. latches or flip flops which hold the datum for a clock cycle before releasing it to the next store. Each of the temporary stores may include or be associated with suitable processing circuitry to determine whether or not the datum should be transmitted on down the connection wire 1330 past the temporary store.

When the datum reaches one of the temporary stores, the indication of the at least one direction is evaluated to determine whether the datum is permitted to be transmitted through the temporary store or whether it should be blocked/prevented from being transmitted further along the switching fabric. For example, when the datum on the connection wire 1330 reaches the temporary store 1340a, the indication as to whether or not the datum is for transmission in the first direction is checked. Since, in this example, the datum is for transmission in the second direction only for delivery to the receiving tile 1320, the datum is prevented from passing beyond the temporary store 1340a.

On the other hand, when the datum reaches the temporary store 1340c, the indication as to whether or not the datum is for transmission in the second direction is checked. In this case, since this indication is positive, the datum is transmitted through the temporary store 1340c along the connection wire 1330. The same check may be carried out and conclusion reached at the temporary stores 1340d, 1340e, and 1340f. This ensures that the datum will reach the receiving tile 1320 via the input multiplexer 1350 of that tile 1320.

Therefore, arrangement of the switching fabric is configured to only pass datums along the one or more directions indicated for transmission in the datum and to prevent the transmission of the datum over the switching fabric in directions not indicated for transmission in the datum. This has the advantage of enabling power optimisation by reducing the transmissions of datums to parts of the switching fabric where there are no tiles that are destined to receive those particular datums. Directional opposites need not apply to the tile exchange directions. For example, if the tile 1310 is sending all of its data for delivery to the tile 1320 having indicators that transmission is allowed in the second direction, but not allowed in the first direction, this does not imply that when the tile 1320 sends data for delivery to the tile 1310 that this data must include indicators that the transmission is allowed in the first direction, but not allowed in the second direction. It could, for example, be the case, that the tile 1320 transmits to the tile 1310 datums having indicators that transmission should take place in both the second direction and the first direction on the switching fabric.

In the exchange phase, all tiles to all tiles communication is enabled. The exchange phase can have multiple cycles. Each tile 4 has control of its own unique input multiplexer 210. Incoming traffic from any other tile in the chip, or from one of the connection links can be selected. Note that it is possible for a multiplexer to be set to receive a 'null' input—that is, no input from any other tile in that particular exchange phase. Selection can change cycle-by-cycle within an exchange phase; it does not have to be constant throughout. Data may be exchanged on chip, or from chip to chip or from chip to host depending on the link which is selected. The present application is concerned mainly with inter-tile communication on a chip. To perform synchronisation on the chip, a small number of pipelined signals are provided from all of the tiles to a sync controller 36 on the chip and a pipelined sync-ack signal is broadcast from the sync controller back to all tiles. In one embodiment the pipelined signals are one-bit-wide daisy chained AND/OR signals. One mechanism by which synchronisation between tiles is achieved is the SYNC instruction mentioned above, or described in the following. Other mechanism may be utilised: what is important is that all tiles can be synchronised between a compute phase of the chip and an exchange phase of the chip (FIG. 3). The SYNC instruction triggers the following functionality to be triggered in dedicated synchronization logic on the tile 4, and in the synchronization controller 36. The sync controller 36 may be implemented in the hardware interconnect 34 or, as shown, in a separate on chip module. This functionality of both the on-tile sync logic and the synchronization controller 36 is implemented in dedicated hardware circuitry such that, once the SYNC instruction is executed, the rest of the functionality proceeds without further instructions being executed to do so.

Firstly, the on-tile sync logic causes the instruction issue for the supervisor on the tile 4 in question to automatically pause (causes the fetch stage 14 and scheduler 24 to suspend issuing instructions of the supervisor). Once all the outstanding worker threads on the local tile 4 have performed an EXIT, then the sync logic automatically sends a synchronization request "sync_req" to the synchronization controller 36. The local tile 4 then continues to wait with the supervisor instruction issue paused. A similar process is also implemented on each of the other tiles 4 in the array 6 (each comprising its own instance of the sync logic). Thus at some point, once all the final workers in the current compute phase 52 have EXITed on all the tiles 4 in the array 6, the synchronization controller 36 will have received a respective synchronization request (sync_req) from all the tiles 4 in the array 6. Only then, in response to receiving the sync_req from every tile 4 in the array 6 on the same chip 2, the synchronization controller 36 sends a synchronization acknowledgement signal "sync_ack" back to the sync logic on each of the tiles 4. Up until this point, each of the tiles 4 has had its supervisor instruction issue paused waiting for the synchronization acknowledgment signal (sync_ack). Upon receiving the sync_ack signal, the sync logic in the tile 4 automatically unpauses the supervisor instruction issue for the respective supervisor thread on that tile 4. The supervisor is then free to proceed with exchanging data with other tiles 4 in via the interconnect 34 in a subsequent exchange phase 50.

Preferably the sycn_req and sync_ack signals are transmitted and received to and from the synchronization controller, respectively, via one or more dedicated sync wires connecting each tile 4 to the synchronization controller 36 in the interconnect 34.

The connection structure of the tile will now be described in more detail.

Each tile has three interfaces:
- an exin interface 224 which passes data from the switching fabric 34 to the tile 4;
- an exout interface 226 which passes data from the tile to the switching fabric over the broadcast exchange bus 218; and
- an exmux interface 228 which passes the control mux signal 214 (mux-select) from the tile 4 to its multiplexer 210.

Figure 4:
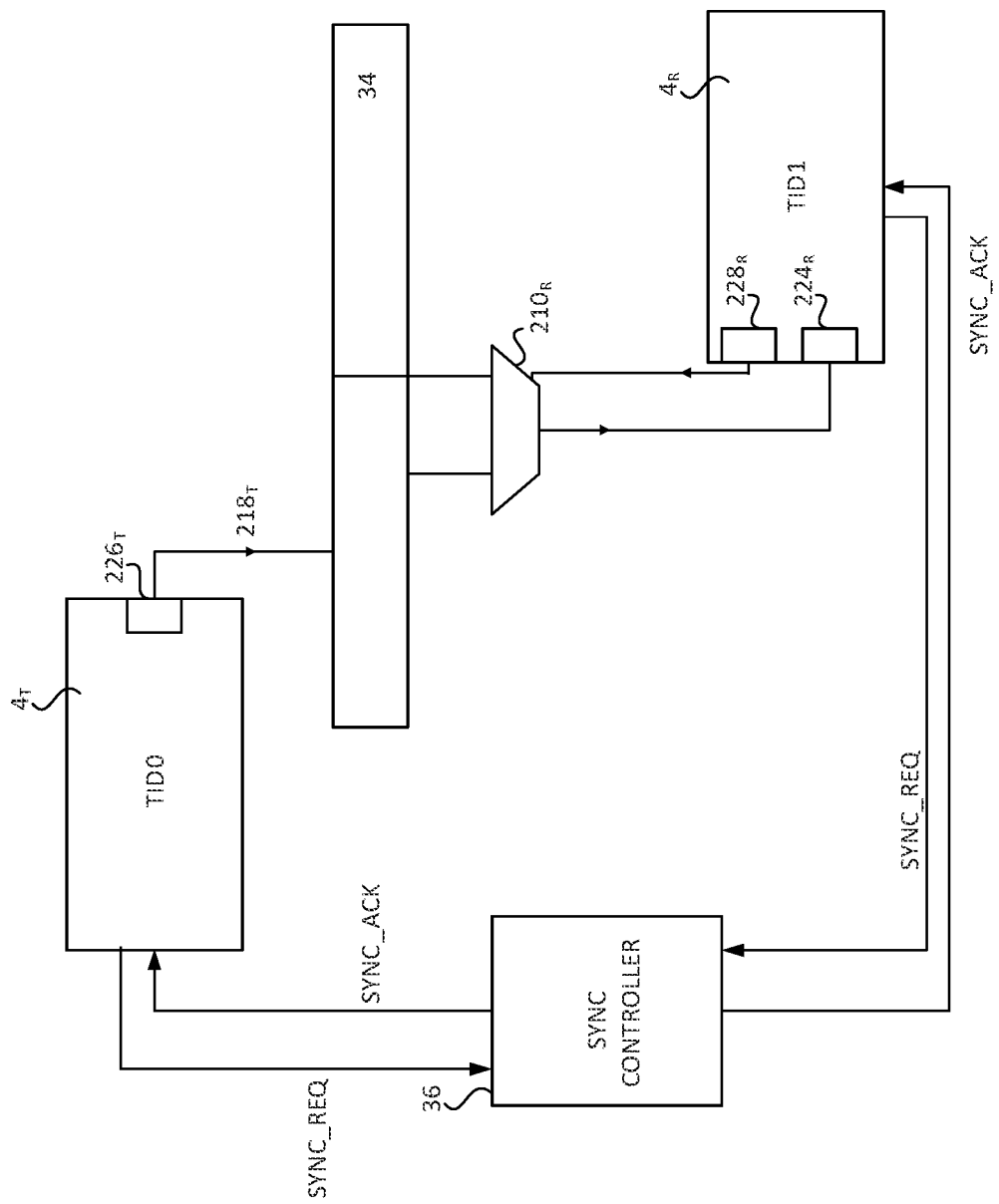
FIG. 4 is a schematic diagram showing two tiles in a time deterministic exchange.

In order to ensure each individual tile executes SEND instructions and switch control instructions at appropriate times to transmit and receive the correct data, exchange scheduling requirements need to be met by the programmer or compiler that allocates individual programs to the individual tiles in the computer. This function is carried out by an exchange scheduler which needs to be aware of the following exchange timing (BNET) parameters. In order to understand the parameters, a simplified version of FIG. 2 is shown in FIG. 4. FIG. 4 also shows a recipient tile as well as a transmitting tile.

I. The relative SYNC acknowledgement delay of each tile, BNET_RSAK (TID). TID is the tile identifier held in a TILE_ID register described later. This is a number of cycles always greater than or equal to 0 indicating when each tile receives the ack signal from the sync controller 36 relative to the earliest receiving tile. This can be calculated from the tile ID, noting that the tile ID indicates the particular location on the chip of that tile, and therefore reflects the physical distances. FIG. 4 shows one transmitting tile $4_T$, and one recipient tile $4_R$. Although shown only schematically and not to scale, the tile $4_T$ is indicated closer to the sync controller and the tile $4_R$ is indicated being further away, with the consequence that the sync acknowledgement delay will be shorter to the tile $4_T$ than for the tile $4_R$. A particular value will be associated with each tile for the sync acknowledgement delay. These values can be held for example in a delay table, or can be calculated on the fly each time based on the tile ID.

II. The exchange mux control loop delay, BNET_MXP (TID of receiving tile). This is the number of cycles between issuing an instruction (PUTi-MUXptr) that changes a tile's input mux selection and the earliest point at which the same tile could issue a (hypothetical) load instruction for exchange data stored in memory as a result of the new mux selection. Looking at FIG. 4, this delay comprises the delay of the control signal getting from the exmux interface $228_R$ of recipients tile $4_R$ to its multiplexer $210_R$ and the length of the line from the output of the multiplexer to the data input exin interface 224.

III. The tile to tile exchange delay, BNET_TT (TID of sending tile, TID of receiving tile). This is the number of cycles between a SEND instruction being issued on one tile and the earliest point at which the receiving tile could issue a (hypothetical) load instruction pointing to the sent value in its own memory. This has been determined from the tile IDs of the sending and receiving tiles, either by accessing a table such as has already been discussed, or by calculation. Looking again at FIG. 4, this delay comprises the time taken for data to travel from transmit tile $4_T$ from its ex_out interface $226_T$ to the switching fabric 14 along its exchange bus $218_T$ and then via the input mux $210_R$ at the receiving tile $4_R$ to the ex_in interface $224_R$ of the receiving tile.

IV. The exchange traffic memory pointer update delay, BNET_MMP( ). This is the number of cycles between issuing an instruction (PUTi-MEMptr) that changes a tile's exchange input traffic memory pointer and the earliest point at which that same tile could issue a (hypothetical) load instruction for exchange data stored in memory as a result of the new pointer. This is a small, fixed number of cycles. The memory pointer has not yet been discussed, but is shown in FIG. 2 referenced 232. It acts as a pointer into the data memory 202 and indicates where incoming data from the ex_in interface 224 is to be stored. This is described in more detail later.

The easterly delay along the exchange BNET_EAST (TIDs, TIDr). This is the delay along the exchange fabric from the sending tile to the recipient tile.

In the below, supertiles are referred to. Each supertile comprises four tiles, each with an identifier as shown in FIG. 16. As explained herein, the tile identifier is in the form of a 5 bit supertile ID, a 4 bit column ID and a 2 bit tile ID.

TID.tile_sub_id[1:0]=TileID[1:0];
TID.column_id[3:0]=TileID[5:2];
TID.supertile_id[4:0]=TileID[10:6];

The path components and their definitions which contribute to these delays are given below.

Figure 5:
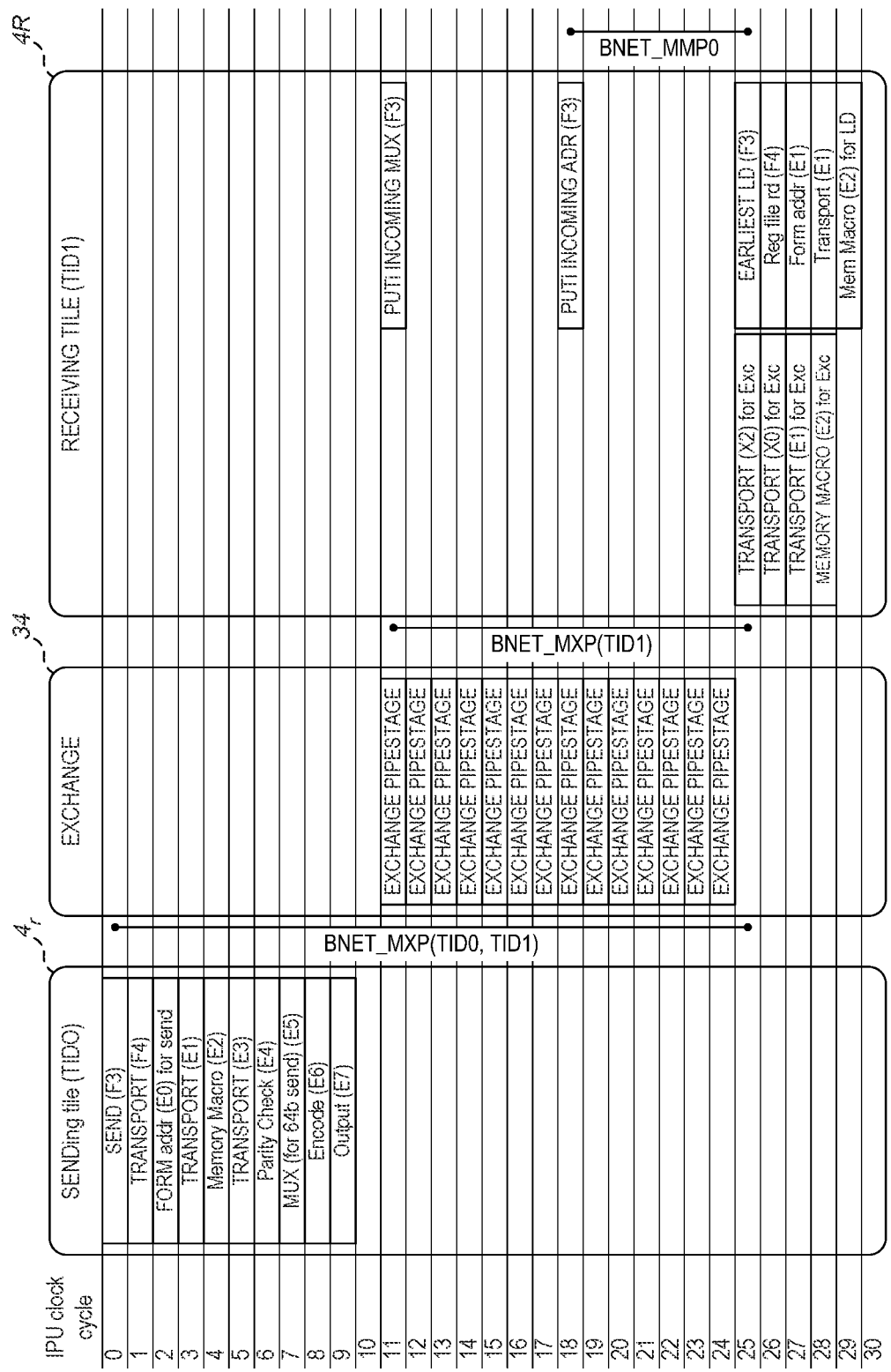
FIG. 5 is a schematic timing diagram illustrating a time deterministic exchange.

FIG. 5 shows the exchange timings in more depth. On the left-hand side of FIG. 4 is the IPU clock cycles running from 0-30. Action on the sending tile $4_T$ occurs between IPU clock cycles 0 and 9, starting with issuance of a send instruction (SEND $F_3$). In IPU clock cycles 10 through 24, the datum pipelines its way through the switching fabric 34.

Looking at the receiving tile $4_R$ in IPU clock cycle 11 a PUTi instruction is executed that changes the tile input mux selection: PUTi-MXptr ($F_3$). In FIG. 5, this PUTi instruction is labelled as "PUTi INCOMING MUX (F3)".

In cycle 18, the memory pointer instruction is executed, PUTi-MEMptr ($F_3$), allowing for a load instruction in ITU clock cycle 25. In FIG. 5, this PUTi instruction is labelled as "PUTi INCOMING ADR (F3)".

On the sending tile $4_t$, IPU clock cycles 1, 3 and 5 are marked "Transport ( )". This is an internal tile delay between the issuance of a SEND instruction and the manifestation of the data of the SEND instruction on the exout interface F4, E1, E3 etcd. Denote datum from earlier SEND instructions in transport to the exout interface. IPU clock cycle 2 is allocated to forming an address EO for a SEND instruction. Note this is where EO is to be fetched from, not its destination address. In IPU clock cycle 4 a memory macro is executed to fetch E2 from memory. In IPU clock cycle 6 a parity check is performed on E4. In IPU clock cycle 7 a MUX output instruction is executed to send E5. In IPU clock cycle 8 E6 is encoded and in IPU clock cycle E7 is output.

```
BNET_RSAK(TID)     =                        Sack_Delay_To_Reach_Other_Side_Of_Exchange(TID) +
                                            Sack_Delay_Along_Exchange_To_Column_Base(TID) +
                                            Column_Base_To_Tile_Delay(TID) +
                                            Sack_Delay_Normalization_Adder;
BNET_TT(TID0, TID1) =                       Send_To_Bxchange_Output_Delay +
                                            Tile_To_Column_Base_Delays (TID0) +
                                            (Column_Base_Compensation_Delay(TID0))/2 +
                                            Column_Base_To_Exchange_Bus_Delay(TID0) +
                                            ABS(Easterly_Delay_Along_Exchange(TID0,TID1)) +
                                            Exchange_Bus_To_Column_Base_Delay(TID0,TID1) +
                                            Column_Base_Compensation_Delay(TID1) +
                                            Column_Base_To_Tile_Delay(TID1) +
                                            Minimum_Exchange_Input_To_Dependent_LD_Delay;
BNET_EAST(TID0, TID1)   = Easterly_Delay_Along_Exchange(TID0, TID1) > 0;
BNET_MXP(TID)       =                       Puti_To_Exchange_Control_Output_Delay +
                                            Tile_To_Column_Base_Delay(TID) +
                                            (7 - Column_Base_Compensation_Delay(TID)) +
                                            Column_Base_To_Opposite_Side_Of_Exchange_Delay +
                                            Opposite_Side_Of_Exchange_To_Column_Base_Delay +
                                            Column_Base_Compensation_Delay(TID) +
                                            Column_Base_To_Tile_Delay(TID) +
                                            Minimum_Exchange_Input_To_Dependent_LD_Delay;
BNET_MMP    = 7; #From E0 ->E0,E1,E2,E3,E4,X0,X2, (LD E0)
Column_Position_East(TID)  =(TID.column_id[3]==1)?15-TID.column_id:TID.column_id;
Send_To_Exchange_Output_Delay               = 8; #from E0 -> E0,E1,E2,E3,E4,E5,E6,E7-> out
Tile_To_Column_Base_Delay(TID)              = TID.supertile_id + 3;
Column_Base_Compensation_delay(TID)         = (7-(TID.column_id MOD 8));
Column_Base_To_Exchange_Bus_Delay(TID)      = (TID.column_id MOD 8)/2 + 2;
Easterly_Delay_Along_Exchange(TID0, TID1) = =
    6*(Column _Position_East(TID1)-Column_Position_East(TID0)) -
    6*(TID0.tile_sub_id[0] ^ TID0.column_id[3]) +
        (TID1.tile_sub_id<2)?(TID1.column_id[3]== TID1.tile_sub_id[0]?1:5) :
             (TID1.column_id[3]== TID1.tile_sub_id[0])?2:4) ;
Exchange_Bus_To_Column_Base_Delay(TID0,TID1)    = (TID0.column_id[3]== TID1.column_id[3])?
                                                  ((TID0.column_id MOD 8) + 1):
                                                  17-((TID0.column_id MOD 8) + 1);
Column_Base_To_Tile_Delay(TID)              = TID.supertile_id + 3;
Minimum_Exchange_Input_To_Dependent_LD_Delay = 2; #X0,X2,(Tilemem E1 == LD E0)
Puti_To_Exchange_Control_Output_Delay       = 8; #from E0 ->E0,E1,E2,E3,E4,E5,E6,E7->out
Column_Base_To_Opposite_Side_Of_Exchange_Delay  = 17;
Opposite_Side_of_Exchange_To_Column_Base_Delay  = 19;#(Note: 19 if extra decode stage is included)
Sack_Delay_To_Reach_Other_Side_Of_Exchange(TID) = TID.column_id[3] * 8;
Sack_Delay_Along_Exchange_To_Column_Base(TID)   = Column_Position_East(TID)*4 + 2;
Sack_Delay_Normalization_Adder              = -5;
```

In the exchange fabric 34, IPU clock cycles 10 through 24 are labelled "exchange pipe stage". In each cycle, a datum moves "one step" along the pipeline (between temporary stores).

Cycles 25-28 denote the delay on the recipient tile $4_R$ between receiving a datum at the exin interface (see Mem Macro (E2) for Exc), while cycles 25-29 denote the delay between receiving a datum at the exin interface and loading it into memory (see Mem Macro (E2)) for LD. Other functions can be carried out in that delay—see Earliest LD (F3), Reg file rd (F4), form adds (EO), Transport (E1).

In simple terms, if the processor of the receiving tile $4_R$ wants to act on a datum (e.g. F3) which was the output of a process on the transmitting tile $4_T$, then the transmitting tile $4_T$ has to execute a SEND instruction [SEND (F3) at a certain time (e.g. IPU clock cycle 0 in FIG. 5), and the receiving tile has to execute a switch control instruction PUTi EXCH MXptr (as in IPU clock cycle 11) by a certain time relative to the execution of the SEND instruction [SEND (F3)] on the transmitting tile. This will ensure that the data arrives at the recipient tile in time to be loaded [earliest LD (F3)] in IPU cycle 25 for use in a codelet being executed at the recipient tile.

Note that the receive process at a recipient tile does not need to involve setting the memory pointer as with instruction PUTi MEMptr. Instead, the memory pointer 232 (FIG. 2) automatically increments after each datum is received at the exin interface 224. Received data is then just loaded into the next available memory location. However, the ability to change the memory pointer enables the recipient tile to alter the memory location at which the datum is written. All of this can be determined by the compiler or programmer who writes the individual programs to the individual tiles such that they properly communicate. This results in the timing of an internal exchange (the inter exchange on chip) to be completely time deterministic. This time determinism can be used by the exchange scheduler to highly optimise exchange sequences.

Figure 14:
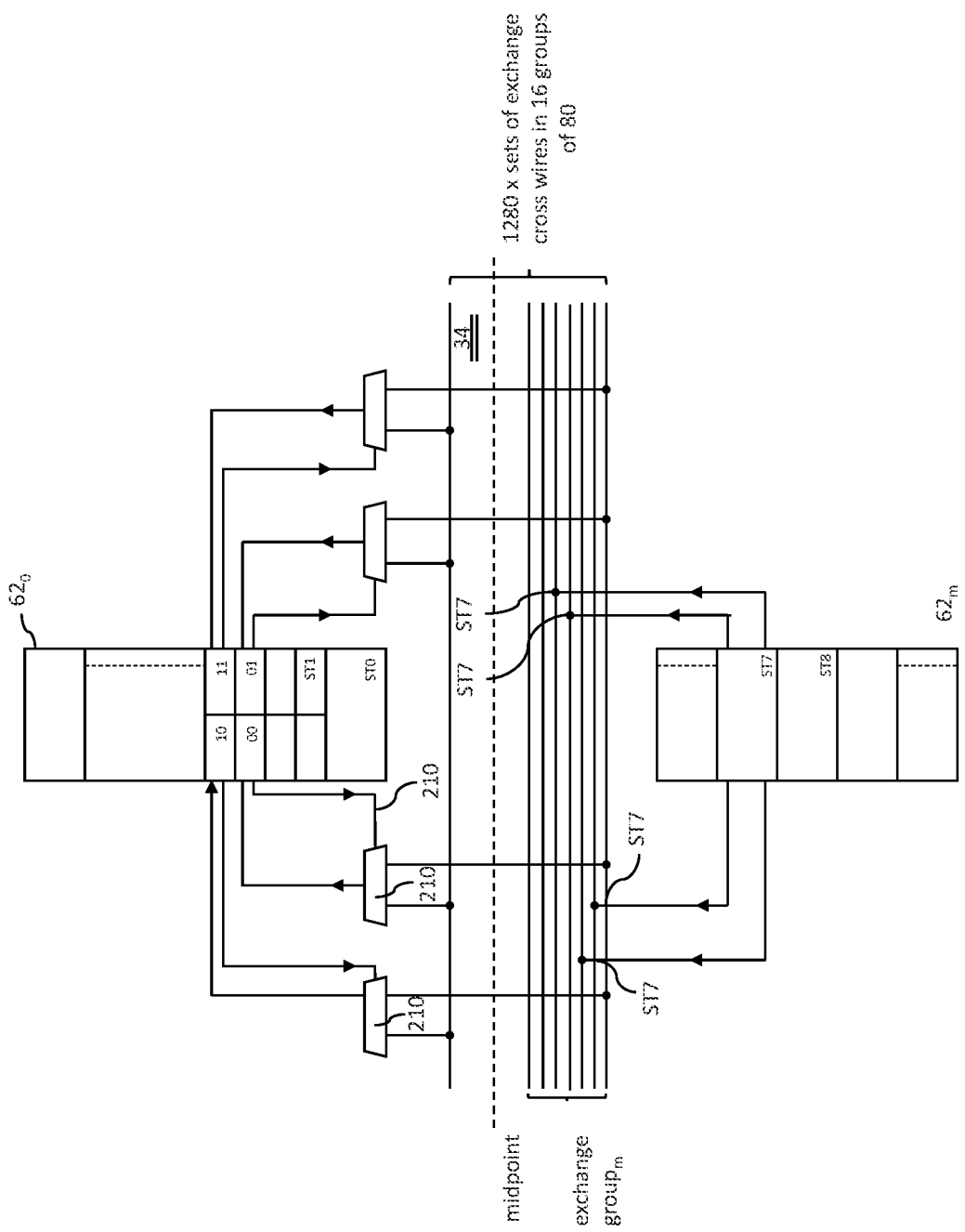
FIGS. 14 and 15 are schematic diagrams of the architecture.
Figure 15:
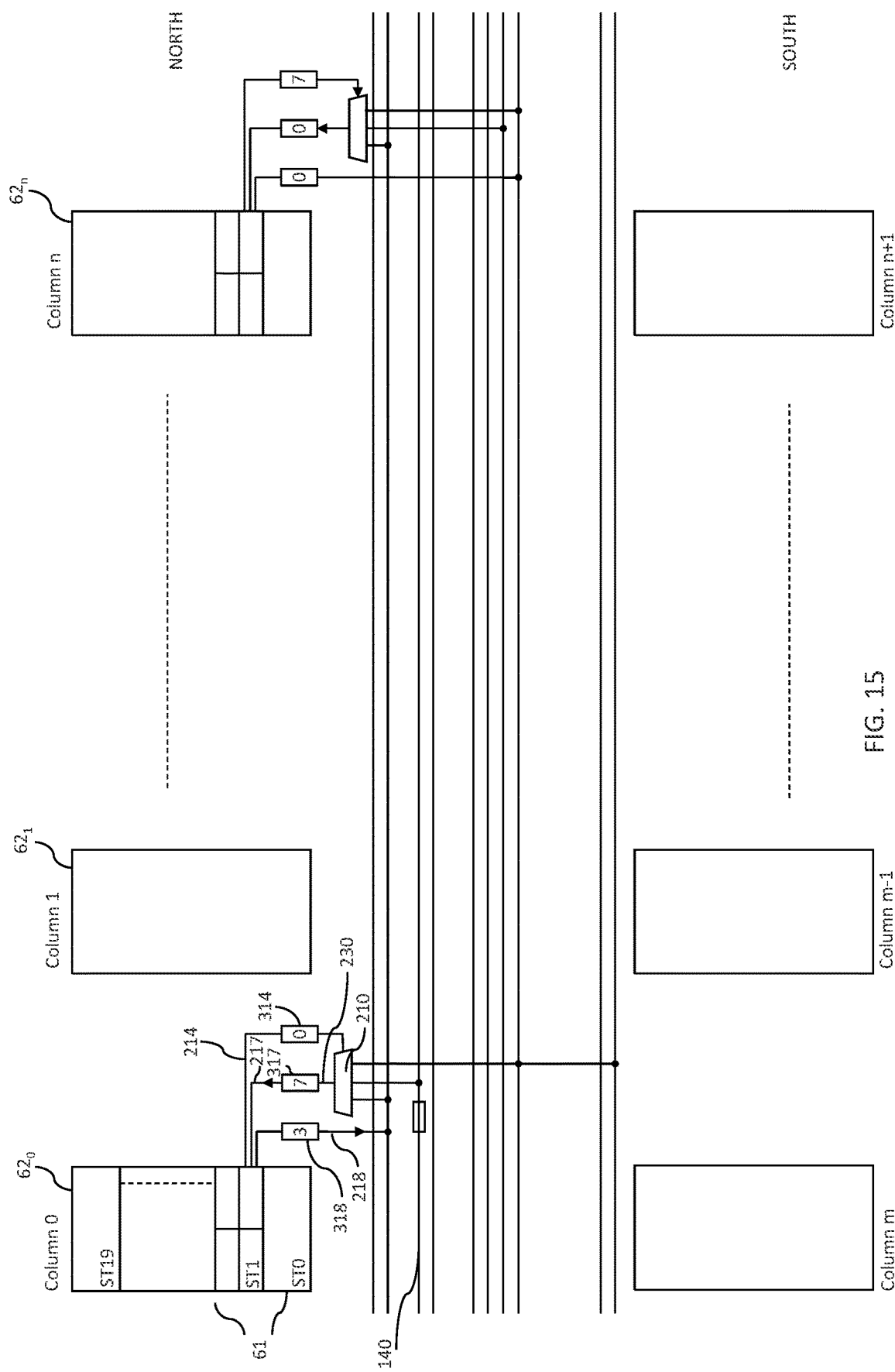

Reference is made to FIGS. 14 and 15, which illustrates an example of the layout of columns on the processor chip 2, illustrating the arrangement of tiles 4 on the chip in more detail. Each tile 4 is part of a set of 4 tiles, referred to as a supertile 61. Each supertile 61 comprises four tiles 4. For simplicity, only a few of the supertiles 61 shown in FIG. 15 are shown divided into their constituent tiles.

Each supertile 61 is part of a subsystem of tiles referred to as a column $62_n$. Therefore, each tile 4 is also part of a column $62_n$. In one embodiment, each column 62 comprises twenty supertiles 61, numbered $ST_0$ to $St_{19}$ (80 tiles in total).

As described above, each tile 4 has a 32 bit input connection 217, and 32 bit output connection 218. As noted, the tile 4 knows (because it is defined in the sequence of instructions compiled for the tile) that it will be expecting a datum from a certain transmitting tile at a certain time, and executes a PUTi-MUXptr instruction, to control the multiplexer to switch at a certain time to the input connected to the set of connecting wires 140 which is connected to the output 218 of the sending tile. This ensures that the datum will appear at the output 230 of the multiplexer 210 at the time that the receiving tile is expecting to receive it.

The multiplexer 210 receives a multiplexor control signal on the control line 214 which identifies a unique tile identifier indicating where that multiplexor should 'point'. That is, to which set of cross wires on the exchange 34 should that multiplexer connect in order to 'listen to' the tile from which a transmission is expected at that time.

Figure 12:
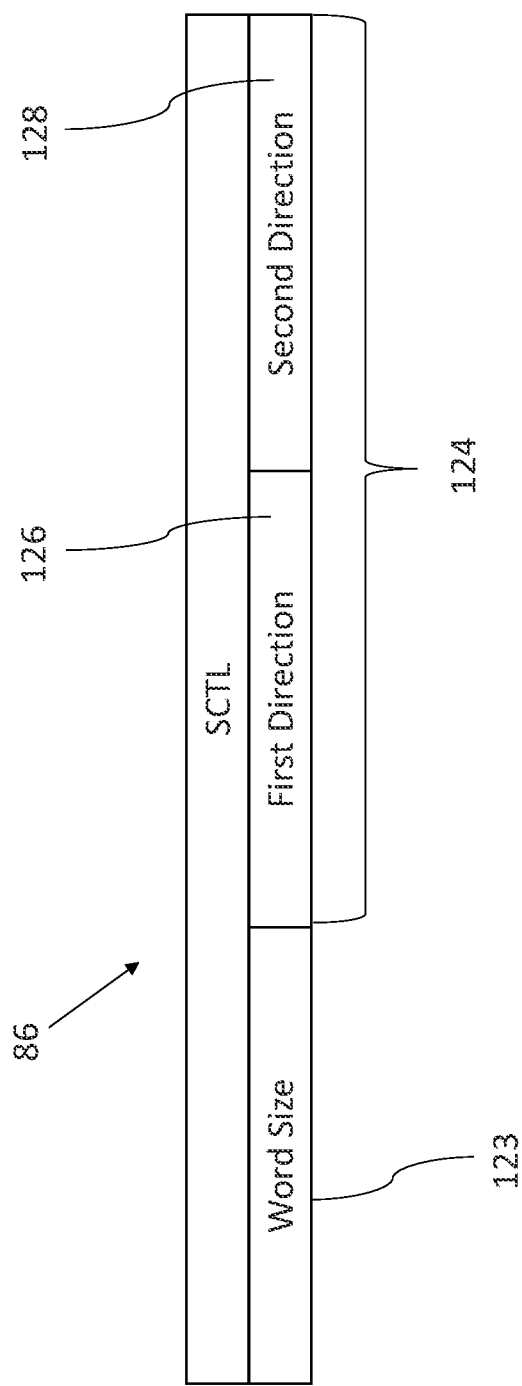
FIG. 12 illustrates an example of control fields usable in a send instruction.

In the arrangement described herein, the multiplexer for the tiles in each column is connected to a bundle of 40 sets of the exchange cross wires. Each set permits a 32 bit datum to be conveyed over the exchange. As further shown in FIG. 14, the sets are divided into two, which are referred to as East and West (depending on which side of the column the multiplexers would be connected to). FIG. 14 shows two multiplexers connected to supertile ST2 on the east side of the column, and two multiplexers connected to supertile ST3 on the East side of the column. On the West side of the column two multiplexers are shown connected to two tiles in supertile ST2. For the sake of clarity, no other multiplexers or connection lines are shown in FIG. 14, but it will be appreciated that there are two multiplexers for each supertile on each side of the column, making a total of twenty multiplexors on the east side and twenty multiplexors on the west side. Each multiplexor should be capable of connecting to any of the 1280 sets of exchange cross wires in the exchange fabric 34. In some chips, only 1216 exchange cross wires are required, but in others all 1280 sets may be active. In order to implement a 1216 way multiplexer, in such a manner that repair can be implemented efficiently, each multiplexer 210 comprises 32 40 way multiplexer slices which are illustrated in FIG. 12. The multiplexer slices are labelled 1210-0, 1210-1 . . . 1210-31. The number of 32 has been chosen to match the number of half-columns in the array connected to each exchange. Note that this number may be varied as the number of columns is varied in any particular processor architecture. However, in preferred embodiments there is one n way multiplexer slice per half-column. The multiplexer 210 comprises a decode block 1220 which receives the MUX control signal on line 214. As mentioned, the decode block receives the unique tile identifier of the transmitting tile on MUX control line 214. The code block 1220 selects one of the 32 multiplexor slices based on the column identifier bits in the tile identifier. Then, the least significant bit of the tile identifier indicates whether an Eastern set of inputs or a Western set of inputs of that multiplexer slice is to be selected (depending on whether the transmitting tile is on the East or West side of the transmitting column). Then, the supertile identifying bits of the tile identifier are used to select one of 20 inputs in the East or Western slice of the multiplexer 1210. In that way, a particular input is selected at the time at which a message from the transmitting tile is expected to be received at the receiving tile in a time deterministic fashion as described earlier.

As further illustrated in FIG. 15, column-based compensation delay may be introduced to allow identical exchange code to be used for similar intra-column exchanges and some similar inter-column exchange patterns. In this context, exchange code comprises the sequence of instructions which are involved in the exchange phase and which manage the exchange of data between tiles. Exchange code comprises at least the SEND instruction and the switch control instruction. In addition, the exchange code may comprise the memory pointer instruction which can determine the address at which incoming data is loaded. Column-based compensation delay can be introduced by selecting a number of delay stages to form a delay circuit introduced into each of the relevant path components of an exchange pathway between tiles. As will be evident from the earlier discussion, an exchange pathway comprises the following components.

There is a tile to column-base delay which is the time taken for a datum to propagate from a processing unit in the column to the base of the column. This delay depends on the position of the tile within the column (and is longer for the tiles which are further away from the base of the column). The tile to column-based delay is fixed by the position of the tile within the column and is therefore the same for all respectively positioned tiles in each column.

The column-compensation delay allows for compensation to be introduced in the output path 218 which conveys the output from the tile to the exchange. This is denoted by block 318 in each of the illustrated output lines. It will be appreciated that in theory, the delay circuit could be located anywhere in the output path 218, but in practice the column-based compensation delay for the output line can readily be implemented as a set of delay stages in the space between the column base and the switching fabric on the chip. FIG. 15 is highly schematic to illustrate the underlying concepts.

The column-base to exchange bus delay is the time taken for the datum to traverse the distance between the column-base (from the column-base compensation delay stage) to the group of exchange bus wires associated with that column. Note from FIG. 15 that this is greater for the eastern columns, because they use exchange bus wires which are further "south" than the western columns. In fact each northern column has output wires connected to a respective adjacent group (moving southerly) of exchange bus wires to the mid point of the exchange. Conversely, each southern column has output wires connected to a respective adjacent group moving northerly.

There is a delay along the exchange fabric while the datum propagates to be picked up at the correct time by the recipient tile (which may be in the same column or another column). Note that there may be exchange fabric delays horizontally even when a tile sends a message to itself.

A further column-base compensation delay may then be introduced on the input side for the recipient tile. This is illustrated in FIG. 15 as delay circuit 317 in the output of the multiplexor 210. Once again, it will be noticed that the inherent path delay from the group of exchange wires to their columns on the East most side is greater than that on the West most side. Note, however, that any compensation delay which is introduced into the input path also affects the exchange MUX control lop delay BNT_MXP. To ensure that this is unaffected, this needs to be compensated for by corresponding delay compensation in the MUX control line 214, as shown by delay circuit 314.

There is then a path component while the datum propagates from the column base (from the output of the column-based compensation delay) to the respective tile in the column. This is based on the position of the tile in the column.

There are two further delays in the exchange path, which are internal to the tiles themselves. At the beginning of a transmitting process, there is a delay between execution of the SEND instruction and the datum arriving at the EX_OUT interface of the tile. This is identical for all tiles.

In addition, there is a delay between receiving a datum at a tile and the first time at which it could hypothetically be loaded. This is identical for all tiles.

Each compensation delay comprises a plurality of delay stages which can be selected when the processor is initially set up. According to one embodiment, the delays could be architected at the time of manufacture of the computer. In another embodiment, the delay stages may be selectable in a soft manner (for example by using bypasses between delay stages) before code is loaded into the respective tiles of the computer.

Without compensation, the intra-column tile to tile exchanges in column n would be longer than that in the columns to the west of it, due to the time taken to traverse the exchange in the northern/southern direction. According to one implementation, the aim is to ensure that intra-column tile to tile exchange delay BNET_TT does not depend on the column identifier. This means that different columns can all run the same exchange code in a time deterministic fashion To achieve this, when the transmitting and recipient tiles are in the same column, the sum of the column-base compensation delay on the output path and the column-base to exchange bus delay is set to be a constant. As explained earlier, the column-base to exchange bus delay varies depending on the column identifier, but this can be accommodated by the column-base compensation delay.

In addition, the sum of the exchange bus to column-base delay and column-based compensation delay on the input side can also be set to a constant value. That is, as explained above, the exchange bus to column-base delay varies depending on the column identifier, but this can be compensated for by the compensation delay on the input side.

By utilising the same constant values for these two sums for each column, the intra-column inter-tile delays do not depend on the column identifier.

In another implementation (which can be implemented in the same architecture as the first), inter-column inter-tile delays also have some regularity and the compensation delays can be designed so that exchange code can be reutilised for certain exchange patterns.

In one case, when the transmitting and recipient tiles are both located in northern or both in southern columns, then the inter-tile delay is a function of (TIDr.column_idMOD 8) TIDs.column_id MOD8). For example, exchange code for traffic between columns 1 and 4 could be reused for a similar exchange pattern between columns 2 and 5, preserving both a direction and physical distance of exchange transaction.

In a second case, when the sending tile is in a northern column and the receiving tile is in a southern column or vice versa, then the inter-tile delays are a function of (TIDr.column_idMOD 8)—(TIDs.column_idMOD 8). For example, exchange code for traffic between columns 0 and 13 could be reused for a similar exchange pattern between columns 1 and 12, preserving both a direction and physical distance of each exchange transaction.

This can be achieved by understanding that there is a component of the inter-tile delay which depends on the relative sending and receiving column identifiers:

the sum of ABS (Easterly delay along exchange TIDs, TIDr)+exchange bus to column-base delay (TIDs, TIDr)+Column-base compensation delay (TIDr).

The first term ABS is a function of the physical column separation: ABS (Column Position East) TIDs−Column Position East (TIDr)).

---

This simplifies to : (TIDs.column_id[3]== TIDr.column_id[3])?
        ABS((TIDs.column_id MOD 8) − (TIDr.column_id MOD 8)):
        ABS((TIDs.column_id MOD 8) − ~(TIDr.column_id MOD 8));
The sum of the second pair of terms simplifies to:
    (TIDs.column_id[3]== TIDr .column_id[3]) ?
        8 + ((TIDs.column_id MOD 8) − (TIDr. column_id MOD 8)):
        16 − ((TIDs.column_id MOD 8) − ~ (TIDr.column_id MOD 8));

```
Simplified delay formulae:
BNET_MXP(TID) =     Puti_To_Exchange_Control_Output_Delay +
                    Tile_To_Column_Base_Delay(TID) +
                    7 +
                    Column_Base_To_Opposite_Side_Of_Exchange_Delay +
                    Opposite_Side_Of_Exchange_To_Column_Base_Delay +
                    Column_Base_To_Tile_Delay (TID) +
                    Minimum_Exchange_Input_To_Dependent_LD_Delay;
BNET_TT(TID0, TID1) = Send_To_Exchange_Output_Delay +
                    Tile_To_Column_Base_Delay(TID0) +
                    5 +
                    ABS(Easterly_Delay_Along_Exchange(TID0,TID1)) +
                    (TIDs.column_id[3]== TIDr.column_id[3])?
                        8 + ((TID0.column_id MOD 8) - (TID1.column_id MOD 8)):
                        16 - ((TID0.column_id MOD 8) - ~(TID1.column_id MOD 8));
                    Column_Base_To_Tile_Delay(TID1) +
                    Minimum_Exchange_Input_To_Dependent_LD_Delay;
```

The table shown in FIG. 17, Table I, indicates one example of compensation delay stage numbers. These are shown diagrammatically in FIG. 15 by the numerals inside the delay compensation circuits for the first column (column 0), and the nth column in the North array (column n). That is, according to this example, for column 0 a tile to exchange delay circuit 318 comprises 3 delay stages. The exchange to tile delay compensation 317 comprises 7 stages. Note that this reflects the difference in time that it takes for an input datum to traverse the exchange bus (in this case in a northerly direction) in the case of column 0 and the case of column n. There is no compensation delay on the switch control line 214 for column 0. However, for the reasons explained above in order to keep the exchange MUX control loop delay unaffected, there is a delay of seven stages for the switch control line from column n.

In the table shown in FIG. 18 one specific arbitrary example is given by way of illustration. In this example, the sending tile 1186 is in column 0, supertile number 18 and the receiving tile 1153 is in column 8, supertile number 18. In this case n=7 (8 columns on each side of the exchange fabric). This exemplifies a particularly long tile to tile delay. As can be seen in the specific example, the column base compensation delay in the outgoing path includes the delay compensation of 3 stages which is consistent with the tile to exchange column-base compensation delay in table I. Moreover, the column-base compensation delay at the receiving side is 7, which is consistent with the exchange to tile compensation delay stages in table I. It will readily be appreciated that table I can be utilised to determine the inter-tile delays for any pair of sending and receiving tile, taking into account the compensation delays along with the other delay parameters already discussed herein. This table can then be utilised to determine the timings of the time deterministic exchanges when code is compiled for the tiles of the respective columns. Note in FIG. 18 that delays along the exchange are defined Easterly, so a Western delay is shown negative (e.g. −43).

There is another factor which needs to be taken into account in some embodiments to allow exchange code compiled specifically for one column (or group of columns) to be run, unaltered on the respective tiles in a different column (or group of columns). In such embodiments, when exchange code is generated, the instructions used to program the incoming multiplexer express the (tileID) pointers explicitly. Thus (for example) if an intra-column exchange code sequence is run on a different column, then the incoming multiplexer settings would point to exchange busses from the original column instead of the busses belonging to the respective tiles in the new column. This can be resolved by programming a COLUMN_OFFSET register (which is in the context status registers of the tile shown in FIG. 2) to a non zero value. This causes all such incoming_mux pointers to be modified (implicitly) just before they are sent to the multiplexer of that tile. For example, to take an intra-column exchange code sequence compiled for the tiles in column 0 and run it instead on the tiles in Column 1; then every tile in Column 1 must program its COLUMN_OFFSET register to '1' before running its part of the exchange code. To run code compiled for a northern column on a southern column (or vice-versa) the notion of 'East' and 'West' is swapped by setting a special bit in the COLUMN_OFFSET register. This matters for all non-multicast send instructions and for 64-bit wide reception. The mechanism of multiplexer control to facilitate the exchange code reuse between topologically similar groups of columns is described below.

Figure 19:
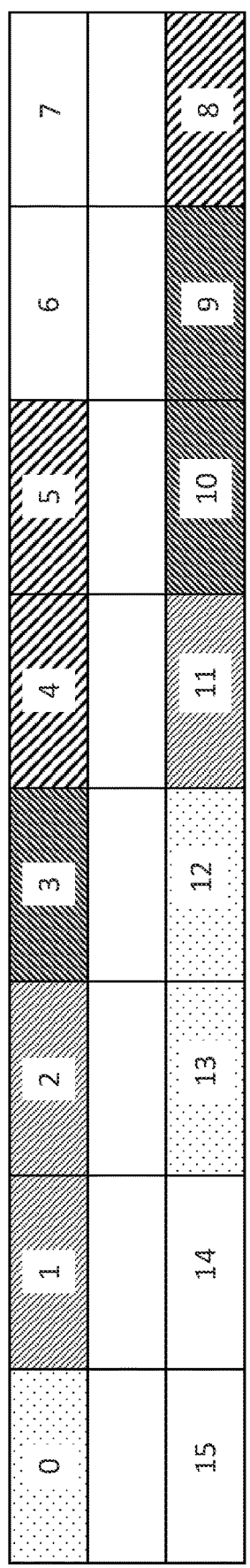

For example: four groups of 3 columns are shown differently shaded in FIG. 19. The four groups of columns illustrated are {1,2,11}, {4,5,8}, {9,10,3}, {12,13,0}. These particular groups have been chosen only to illustrate this mechanism's flexibility—other options are possible. Assuming that exchange code is generated for the tiles in one of the groups—then the same code can reused in the other groups. To make this possible—the column_id field within the context status register $INCOMING_MUX is adjusted implicitly by a hardware mechanism in each tile. Hardware in each tile processor modifies the column_id field in $INCOMING_MUX (bits [5:2]) as in Equation 1:

modified_column_id [3:0]=MOD($INCOMING_MUX[5:2]+(($INCOMING_MUX[5:2]< 8)? $COLUMN_OFFSET[3:0]: −$COLUMN_OFFSET[3:0]), 16)

The modified_column_id is used by the exchange hardware instead of $INCOMING_MUX[5:2]. The other fields of $INCOMING_MUX remain unaltered. Furthermore, the exchange hardware will reverse the E/W directionality of non-multicast SENDs if $COLUMN_OFFSET [4]==1. Packets may include direction bits EV or WV which indicate the direction in which the recipient tile lies, relative to the sending column. These may be used to prevent packets being unnecessarily transmitted along the exchange as described in our earlier patent application [PWF Ref: 409364GB]. To reuse exchange code, the EV and WV bits (either from instruction's immediate bits or from address bits in a send address context status register) are swapped before they are driven to the exchange when $COLUMN_OFFSET[4]==1).

The value $COLUMN_OFFSET[4:0] is a context status register value that is written prior to running the reused exchange code to the values in Equation 2:

$COLUMN_OFFSET[3:0]–(compiled_column_
id<8)? MOD(modified_column_id–compiled_
column_id, 16): MOD(compiled_column_id–
modified_column_id, 16)

The 'compiled_column_id' is the column_id of any column within the particular group for which the exchange code was compiled. The 'modified_column_id' is the column_id of the column in the same position in its group of columns as 'compiled_column_id'. (NB: The value $COLUMN_OFFSET[4] indicates whether the tile's column pole position (north/south) is the same as the column pole position of the tile for which the exchange code was originally compiled. Equations 1 and 2 are applied to the example of FIG. 19 to provide the schema shown in FIG. 19A.

Figure 20:
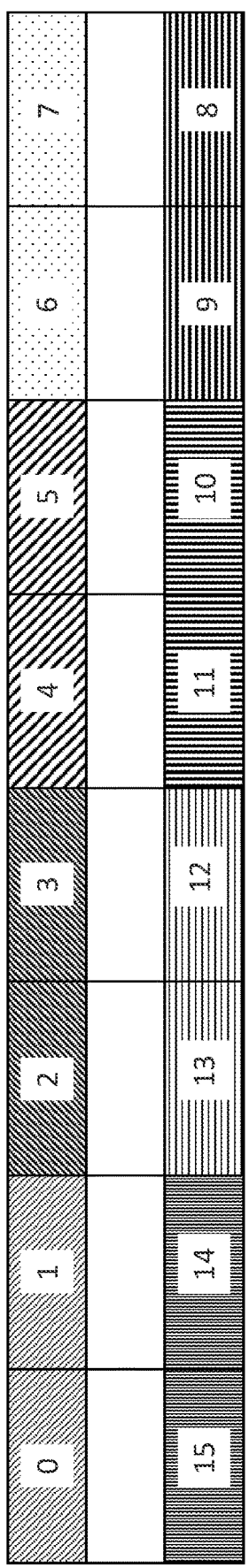

Another example is shown in FIGS. 20 and 20A.

Figure 6:
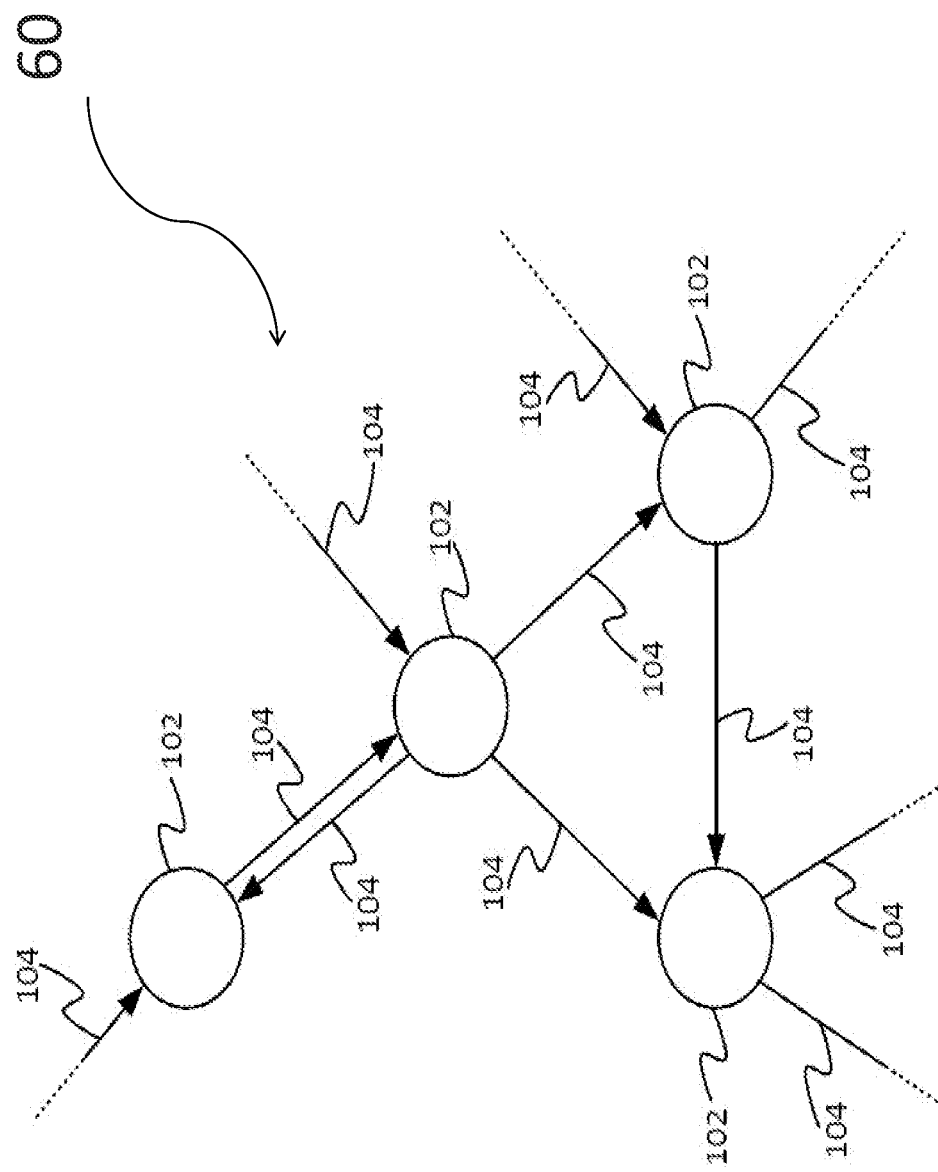
FIG. 6 is one example of a machine intelligence graph.

FIG. 6 illustrates an example application of the processor architecture disclosed herein, namely an application to machine intelligence.

As mentioned previously and as will be familiar to a person skilled in the art of machine intelligence, machine intelligence begins with a learning stage where the machine intelligence algorithm learns a knowledge model. The model may be represented as a graph 60 of interconnected nodes 102 and links 104. Nodes and links may be referred to as vertices and edges. Each node 102 in the graph has one or more input edges and one or more output edges, wherein some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Each edge 104 communicates a value commonly in the form of a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. These results are sometimes referred to as activations. Each function is parameterized by one or more respective parameters (sometimes referred to as weights, though they need not necessarily be multiplicative weights). In general the functions represented by the different nodes 102 may be different forms of function and/or may be parameterized by different parameters.

Further, each of the one or more parameters of each node's function is characterized by a respective error value. Moreover, a respective error condition may be associated with the error(s) in the parameter(s) of each node 102. For a node 102 representing a function parameterized by a single error parameter, the error condition may be a simple threshold, i.e. the error condition is satisfied if the error is within the specified threshold but not satisfied if the error is beyond the threshold. For a node 102 parameterized by more than one respective parameter, the error condition for that node 102 may be more complex. For example, the error condition may be satisfied only if each of the parameters of that node 102 falls within respective threshold. As another example, a combined metric may be defined combining the errors in the different parameters for the same node 102, and the error condition may be satisfied on condition that the value of the combined metric falls within a specified threshold, but otherwise the error condition is not satisfied if the value of the combined metric is beyond the threshold (or vice versa depending on the definition of the metric). Whatever the error condition, this gives a measure of whether the error in the parameter(s) of the node falls below a certain level or degree of acceptability.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that, the output of the graph is as close as possible to a desired result. As the graph as a whole tends toward such a state, the calculation is said to converge.

For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or punishment, or such like. Over many trials the algorithm can gradually tune the parameters of the graph to be able to predict inputs that will result in a positive outcome. The various approaches and algorithms for learning a graph will be known to a person skilled in the art of machine learning.

According to an exemplary application of the techniques disclosed herein, each worker thread is programmed to perform the computations associated with a respective individual one of the nodes 102 in a machine intelligence graph. In this case the edges 104 between nodes 102 correspond to the exchanges of data between threads, at least some of which may involve exchanges between tiles.

Figure 7:
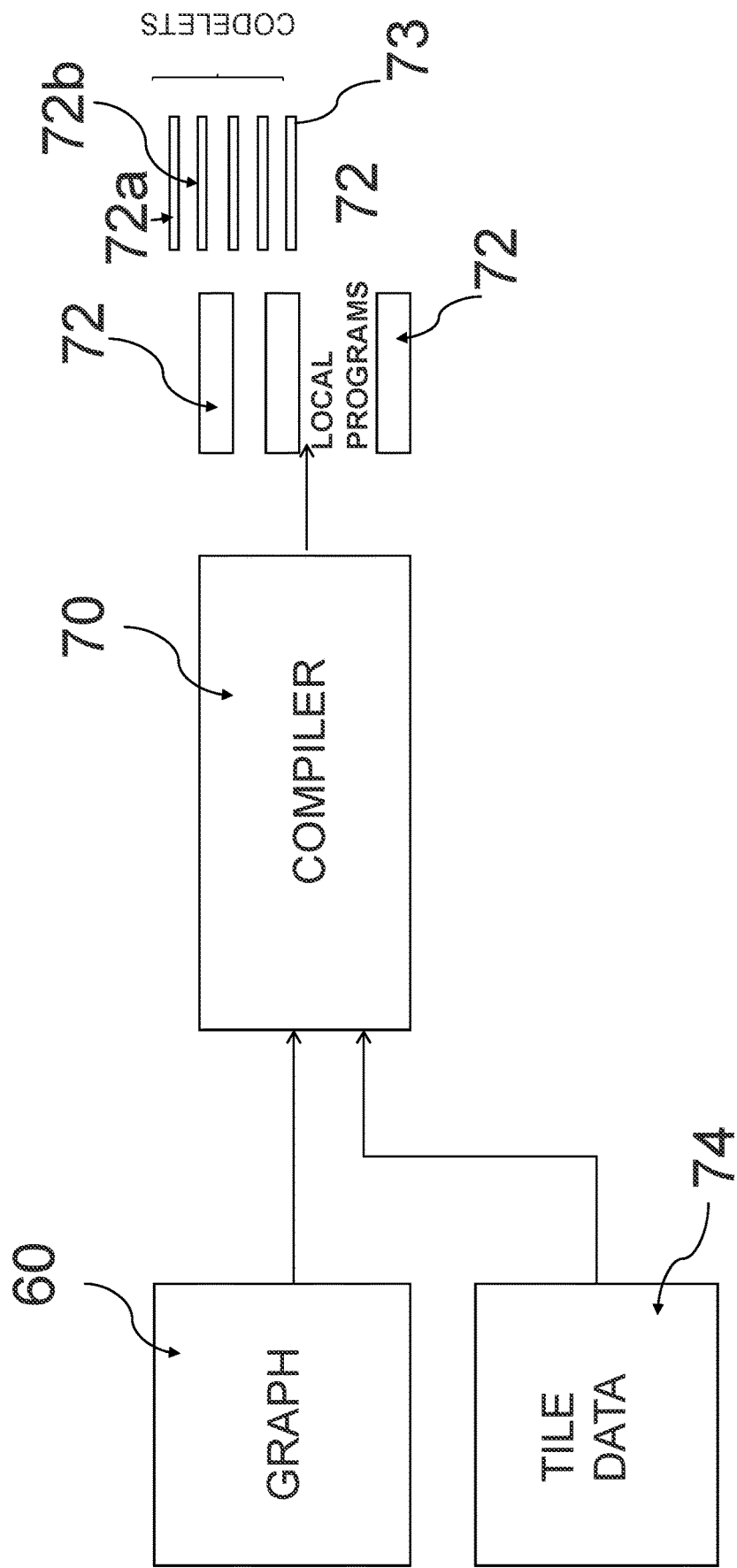
FIG. 7 is a schematic architecture illustrating operation of a compiler for generating time deterministic programs.

FIG. 7 is a schematic diagram illustrating the function of a compiler 70. The compiler receives such a graph 60 and compiles the functions in the graphs into a multiplicity of codelets, which are contained into local programs labelled 72 in FIG. 7. Each local program is designed to be loaded into a particular tile of the computer. Each program comprises one or more codelets forming worker threads 72a, 72b . . . plus a supervisor sub-program 73 each formed of a sequence of instructions. The compiler generates the programs such that they are linked to each other in time, that is they are time deterministic. In order to do this the compiler accesses tile data 74 which includes the tile identifiers described earlier which are indicative of the location of the tiles and therefore the delays which the compiler needs to understand in order to generate the local programs. The delays have already been mentioned above, and can be computed based on the tile data. Alternatively, the tile data can incorporate a data structure in which these delays are available through a lookup table. The supervisor program comprises exchange code which manages the exchange of data in the exchange phase.

Figure 8:
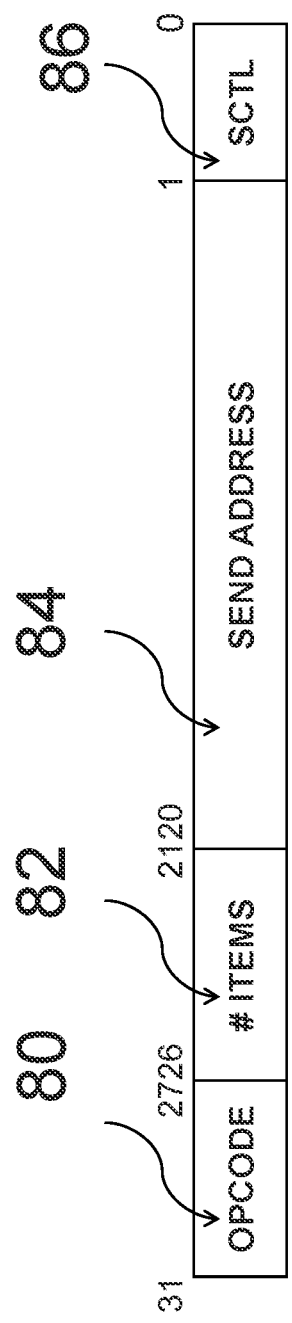

There now follows a description of instructions which have been developed as part of the instruction set for the computer architecture defined herein. FIG. 8 shows a SEND instruction of 32 bits. A SEND instruction indicates a data transmission from tile memory. It causes one or more data stored at a particular address in the local memory 22 of a tile to be transmitted at the exout interface of a tile. Each datum (referred to as "item" in the instruction) can be one or more words long. A SEND instruction acts on one word or multiple words to implement a send function. The SEND instruction has an opcode 80, a field 82 denoting a message count, the number of items to be sent in the form of one or more packet from the SEND address denoted in an address field 84. The field 84 defines the address in the local memory from which the items are to be sent in the form of an immediate value which is added to a base value stored in a base address register. The SEND instruction also has a send control field 86 (SCTL) which denotes the word size, selected as one of 4 and 8 bytes. The packet has no destination identifier in it: In other words, the recipient tile which is to receive the items is not uniquely identified in the instruction. The send function causes the specified number of data items from the send address to be accessed from the local memory and placed at the ex_out interface of the tile to be transmitted at the next clock cycle. In another variation of the SEND instruction, the address from which items are to be sent could be implicit; taken from base value in the base address register and a delta value in an outgoing delta register. The delta value may be set based on information in a previous SEND instruction. In place of a unique identifier of the intended recipient tile, the compiler has arranged that the correct recipient tile will switch its local multiplexer(s) at the correct time to receive the datum (data items) as already described herein. Note that an intended recipient tile could be the transmitting tile itself in some cases.

Reference is made to FIG. 12, which shows an example of a send control field 86 (SCTL), which may be incorporated in a send instruction. The SCTL 86 may include an indication of a word size 123, which may indicate a value for the word size of 32 or 64 bits. The SCTL 86 may also include the indication 124 of at least one direction in which the datum is to be passed/transmitted along the switching fabric 34, as described previously. The indication 124 of the at least one direction may comprise an indication 126 as to whether or not the datum is to be transmitted in a first direction along the switching fabric 34 from the transmitting tile, and an indication 128 as to whether or not the datum is to be transmitted in a second direction along the switch fabric 34 from the transmitting tile. The indications 126 and 128 may each be represented by a single bit.

When the send instruction is executed, the indication 124 of the at least one direction may be included in a datum, which is then transmitted over the switching fabric.

If a send instruction is issued to transmit a datum to one or more receiving tiles that are located in the first direction from the transmitting tile, then the indication 124 of the at least one direction may contain an indication 126 that the datum is to be transmitted in the first direction from the transmitting tile. If there are no tiles for receiving the datum that are located in the second direction from the transmitting tile, then the indication 124 of the at least one direction may contain an indication 128 that the datum is not to be transmitted in the second direction from the transmitting tile. In this case, the datum is passed by the switching fabric 34 in the first direction only and is prevented from passing in the second direction. In some examples, the datum may be transmitted only as far as the at least one mux which is destined for receiving the datum. In this case, the datum may not be transmitted any further along the switching fabric 34 in the first direction beyond the at least one mux which is destined for receiving the datum.

If a send instruction is issued to transmit a datum to one or more receiving tiles that are located in a second direction from the transmitting tile, then the indication 124 of the at least one direction may contain an indication 128 that the datum is to be transmitted in the second direction from the transmitting tile. If there are no tiles for receiving the datum that are located in the first direction 126 from the transmitting tile, then the indication 124 of the at least one direction may contain an indication 126 that the datum is not to be transmitted in the first direction from the transmitting tile. In this case, the datum is passed by the switching fabric 34 in the second direction only and is prevented from passing in the first direction. In some examples, the datum may be transmitted only as far as the at least one mux which is destined for receiving the datum. In this case, the datum may not be transmitted any further along the switching fabric 34 in the second direction beyond the at least one mux which is destined for receiving the datum.

If a send instruction is issued to transmit to a plurality of receiving tiles, at least one of which is located in the first direction from the transmitting tile and at least one of which is located in the second direction from the transmitting tile, the indication 124 of the at least one direction may contain an indication 126 that the datum is to be transmitted in the first direction from the transmitting tile and an indication 128 that the datum is to be transmitted in the second direction from the transmitting tile. In this case, the datum is transmitted along the switching fabric 34 in the first direction and the second direction.

In some cases, the indication 124 of the at least one direction may comprise an indication 126 that the datum is not to be transmitted in the first direction and an indication 128 that the datum is not to be transmitted in the second direction. In this case, in response to execution of the send instruction of the processor of a tile, no datum may be transmitted. In some cases, the execution of such a send instruction may cause an exception to be raised.

In the case in which the indication of the at least one direction that is inserted into a datum contains indications that the datum is to be transmitted in the first direction and the second direction, the switching fabric may be configured to pass the datum in both directions. Once the datum reaches a mux of a tile, which it is intended for delivery, in this case, it continues on through the switching fabric without being blocked at the mux.

In the case in which the indication of the at least one direction that is inserted into a datum contains an indication that the datum is to be transmitted in only one of the first direction and the second direction, the switching fabric may be configured to pass the datum in the one direction that is indicated to the first mux of a receiving tile only. The datum may be blocked from passing along the switching fabric past the first mux.

Therefore, in order to transmit a datum to multiple receiving tiles, even if those receiving tiles are all in the same direction from the transmitting tile, the transmitting tile may be configured to insert indications that the datum is to be transmitted in the first direction and the second direction into the datum, so that the datum does is not blocked at the first receiving mux.

In order to ensure that the correct recipient tile will switch its local multiplexer at the correct time to receive the datum, a switch control function is provided, as described above.

Figure 9:
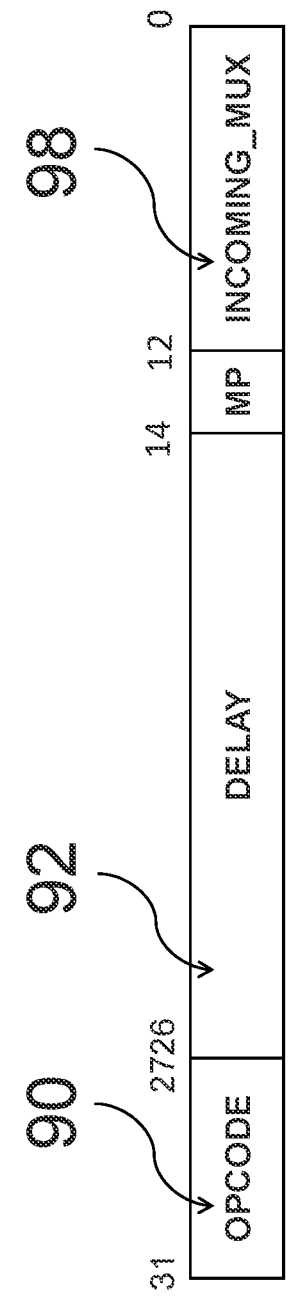

FIG. 9 illustrates a PUT-i-MUX instruction which performs this function. An opcode field 90 defines the instruction as a PUT-i-MUX instruction. A delay period can be specified by a delay immediate value 92. This delay value can be used to replace 'no op' instructions, and is a way to optimise code compression. This instruction, when executed, defines in incoming_mux field 98 which input of the multiplexer 210 is to be set to 'listen' for items which have been sent from another tile. For the sake of compactness, this mux control function could be combined in a single instruction with a send function defined above, as shown in FIG. 10. Note that there is no connection between the send function, which causes the tile to act as a transmitting tile, and the switch control function, which is a function when the tile is acting as a recipient tile, other than that they can be performed in a single execution cycle on the same tile.

FIG. 10 is an example of a "merge" instruction. In this context, a "merge" instruction means an instruction that defines two or more functions which can be carried out at the same time (in one execution cycle) on one tile FIG. 10 illustrates a form of 'merge' send instruction, wherein a send function is combined with a second function which can modify the state held in registers at the tile. One function is to change the memory pointer for data received at that tile. Another function is to set the incoming MUX. The PUTi_MEMptr function enables a memory location in the local memory at which the next datum received by the tile is to be loaded to be identified. This function could be carried out by a dedicated 'receive' instruction, although its function is not to enable receipt of a datum but to modify the memory pointer. In fact, no specific instruction needs to be executed to receive data at a tile. Data arriving at the exin interface will be loaded into the next memory location identified by the memory pointer, under the control of the exin interface. The instruction of FIG. 10 has opcode field 100 and a number of items to be sent field 102. The immediate value in incoming state modification field 106 is written to an exchange configuration state register specified by field 104. In one form, the state modification field 106 may write an incoming delta for calculating the receive address to which the memory pointer is to be set. In another form the exchange configuration state is written with the incoming MUX value which sets the multiplexer input.

For this form of "merge" instructions, the send function uses a send address determined from values stored in one or more registers which is implicit in the instruction. For example, the send address can be determined from the base register and the delta register.

FIG. 11 shows a "double width" instruction, referred to as an exchange instruction (EXCH). This instruction initiates a data transmission from an indicated address in the tile memory and sets the incoming exchange configuration state (the multiplexer and/or the memory pointer for receiving data). The EXCH instruction is unique in that it is immediately followed by an inline 32-bit payload, located at the memory location immediately after the instructions. The EXCH instruction has an opcode field 110 which denotes an exchange instruction EXCH. The payload has a 'coissue' flag 119.

The EXCH instruction includes format field 112 which has a single bit which specifies incoming format datum width (32 bits or 64 bits). The datum width can have implications on the setting of the multiplexer lines (whether they are set singly or in pairs). An item field 114 defines the number of items which are caused to be sent by the exchange instruction. These items are sent from a sent address calculated using the immediate in field 116, as in the send instruction of FIG. 9. The value in this field is added to the value in the base register.

Reference numeral 118 denotes a control field which defines word size for the send datum. The payload includes a switch control field 120 which acts a switch control for the incoming multiplexer, as described above in connection with FIG. 9. Numeral 122 denotes a field of the payload defining an incoming delta for calculating the address at which incoming data is to be stored, as described above in connection with the instruction of FIG. 10. The 64 bit wide exchange instruction EXCH of FIG. 11 can be executed every clock cycle and thus allows simultaneously:

sending from a particular address
updating of incoming mux
updating of incoming address Thus, any exchange schedule can be encoded in a single instruction. The instructions of FIGS. 8, 9 and 10 perform similar functions but as they are only 32 bits long can be used to minimize the size of the exchange code in the local memory of each tile. The decision about which instruction to use in any particular context is made at the compiler 70 when constructing the codelets for the local program 72.

There follows a list of key registers and their semantics to support the above instructions. These registers from part of the register file on each tile.

| | |
|---|---|
| TILE_ID | Holds a unique identifier for that tile |
| INCOMING_MUX [INCOMING_MUXPAIR] | Holds the Tile ID of the source tile for incoming messages, which acts to select the 'listening' input for the multiplexer associated with the receiving Tile. [When inputs are paired, this implies a 64 bit data item.] |
| INCOMING_DELTA | This holds an auto incrementing value for calculating on address at which incoming data are to be stored: it can be overwritten by an explicit field [e.g. see FIG. 10]. It is added to INCOMING_BASE. |
| INCOMING_BASE | This holds a common base address for updating memory pointer (added to INCOMING_DELTA). |
| OUTGOING_BASE | This holds a common base address for send instructions |
| OUTGOING_DELTA | This holds delta for calculating send addresses instructions A 'send' address is outgoing base + outgoing delta. |
| INCOMING_FORMAT | Identifies 32b or 64b incoming datum. |

Note that the INCOMING_DELTA and INCOMING_MUX register form part of the exchange state of tile.

There has been described herein a technique for optimising usage of processing units in a new computer paradigm which is particularly effective in the context of knowledge models for machine learning. An architecture is provided which utilises time determinism as in an exchange phase of a BSP paradigm to efficiently process very large amounts of data. While particular embodiments have been described, other applications and variants of the disclosed techniques may become apparent to a person skilled in the art once given the disclosure herein.

What is claimed is:

1. A computer comprising:
a plurality of processing units each having an input interface with a set of input wires, and an output interface with a set of output wires;
a switching fabric connected to each of the processing units by a respective set of output wires and connectable to each of the processing units by a respective set of input wires via switching circuitry controllable by the respective processing unit;
the processing units arranged in columns, each column having a base processing unit proximate the switching fabric and multiple processing units one adjacent the other in respective positions in the direction of the column;
wherein to implement exchange of data between the processing units each of at least one of the processing units is configured to transmit onto its output wires, at a transmit time, a data packet for delivery over the switching fabric to a recipient processing unit, the respective data packet having no destination identifier of the recipient processing unit when sent over the switching fabric but destined for receipt at the recipient processing unit with a predetermined delay relative to the transmit time, wherein the predetermined delay is dependent on an exchange pathway, including a pathway over the switching fabric, between the transmitting and recipient processing units,
wherein a first exchange pathway, including a first pathway over the switching fabric, between any first pair of transmitting and recipient processing units at respective positions in one column has a same delay as another exchange pathway, including another pathway over the switching fabric, between another pair of transmitting and recipient processing units at corresponding respective positions in any other of the columns;
wherein a first column is spaced from a first group of exchange wires of the switching fabric by a first physical distance, and a second column is spaced from a second group of exchange wires of the switching fabric by a second physical distance, wherein the second physical distance is greater than the first physical distance, and wherein a compensation delay is disposed between the first column and the first group of wires; and
wherein a column to switching fabric path delay of the first column is the same as a column to switching fabric path delay of the second column.

2. A computer according to claim 1 wherein each of the exchange pathways includes a pathway component which extends from a respective processing unit in the respective column to the base processing unit of the respective column.

3. A computer according to claim 1 wherein the switching fabric extends in a first direction, and each column extends in a second direction perpendicular to the first direction.

4. A computer according to claim 1 which comprises n columns located on a first side of the switching fabric and n columns located on a second side of the switching fabric and extending away from the switching fabric in a reverse direction.

5. A computer according to claim 4 where n is 8.

6. A computer according to claim 1 wherein the compensation delay comprises a column base to tile path component based on a distance along the first column of the respective processing unit from the base processing unit.

7. A computer according to claim 1 wherein each processing unit has instruction storage holding a local program including exchange code, an execution unit configured to execute the local program and data storage for holding data, wherein the exchange code of a processing unit at a first position in one of the columns is the same as exchange code of a processing unit in the same respective position of another column.

8. A computer according to claim 7 wherein the exchange code comprises a SEND instruction which causes the data packet to be transmitted at the transmit time to a recipient processing unit in the same column.

9. A computer according to claim 7 comprising a synchronisation module operable to generate a synchronisation signal to control the computer to switch between a compute phase and an exchange phase, wherein the processing units are configured to execute their local programs according to a common clock, the local programs being such that the at least one processing unit is configured to transmit the data packet in the exchange phase.

10. A computer according to claim 9 wherein the synchronisation signal is received at each column via a respective synchronisation delay stage such that the synchronisation signal is received at each processing unit in the computer at the same time.

11. A computer comprising:
a plurality of processing units; and
a switching fabric connectable to each of the processing units via switching circuitry controllable by each processing unit;
the processing units arranged in a first column and a second column, the first column having a first base processing unit proximate the switching fabric and a first plurality of processing units one adjacent the other in respective positions in the first column, the second column having a second base processing unit proximate the switching fabric and a second plurality of processing units one adjacent the other in respective positions in the second column,;
wherein a first processing unit of the first plurality of processing units is configured to transmit at a transmit time a data packet via the switching fabric to a second processing unit of the first plurality of processing units, the data packet having no destination identifier of the second processing unit when sent over the switching fabric and destined for receipt at the second processing unit with a delay relative to the transmit time, wherein the delay is dependent on a first exchange pathway between the first processing unit and the second processing unit, the first exchange pathway including a pathway over the switching fabric, wherein a given exchange pathway, including a first pathway over the switching fabric, between any pair of transmitting and recipient processing units at respective positions in the first column has a same delay as an exchange pathway, including a second pathway over the switching fabric, between a pair of transmitting and recipient processing units at corresponding respective positions in the second column;

wherein the first column is spaced from a first group of exchange wires of the switching fabric by a first physical distance, and the second column is spaced from a second group of exchange wires of the switching fabric by a second physical distance, wherein the second physical distance is greater than the first physical distance, and wherein a compensation delay is disposed between the first column and the first group of wires; and wherein a column to switching fabric path delay of the first column is the same as a column to switching fabric path delay of the second column.

12. A computer according to claim 11 wherein the first exchange pathway includes a pathway component which extends from the first processing unit in the first column to a base of the first column.

13. A computer according to claim 11, wherein the compensation delay comprises an item selected from a list consisting of: an output compensation delay circuit arranged in an output set of connection wires of each processing unit in the first column; and an input compensation delay circuit arranged in a set of input wires for each tile in the first column.

14. A computer according to claim 11, wherein each processing unit has instruction storage holding a local program including exchange code, an execution unit configured to execute the local program and data storage for holding data, wherein the exchange code of a given processing unit at a first position in the first column is the same as the exchange code of a processing unit in the same respective position of the second column.

15. A computer according to claim 14 wherein the exchange code comprises a SEND instruction which causes the data packet to be transmitted at the transmit time.

16. A computer according to claim 11, wherein for the second column, different processing units of the second plurality of processing units are displaced from the switching fabric by different distances, the different distances increasing in the direction of the second column.

17. A computer according to claim 1, wherein the predetermined delay relative to the transmit time comprises a predetermined number of clock cycles, the predetermined number of clock cycles being dependent on the exchange pathway between the transmitting and recipient processing units, wherein the same delay comprises a same number of clock cycles.

18. A computer comprising:
a plurality of processing units each having an input interface with a set of input wires, and an output interface with a set of output wires;
a switching fabric connected to each of the processing units by a respective set of output wires and connectable to each of the processing units by a respective set of input wires via switching circuitry controllable by the respective processing unit;
the processing units arranged in columns, each column having a base processing unit proximate the switching fabric and multiple processing units one adjacent the other in respective positions in the direction of the column, wherein for each column, different ones of the processing units in the respective column are displaced from the switching fabric by different distances, the different distances increasing in the direction of the respective column;
wherein to implement exchange of data between the processing units each of at least one of the processing units is configured to transmit onto its output wires, at a transmit time, a data packet for delivery to a recipient processing unit, the respective data packet having no destination identifier of the recipient processing unit but destined for receipt at the recipient processing unit with a predetermined delay relative to the transmit time, wherein the predetermined delay is dependent on an exchange pathway, including a pathway between the transmitting and recipient processing units, wherein an exchange pathway between any pair of transmitting and recipient processing units at respective positions in one column has a same delay as an exchange pathway between each pair of transmitting and recipient processing units at corresponding respective positions in other columns, wherein the switching fabric comprises a plurality of groups of exchange wires, each group having wires connected to each of the output wires of the processing units of a respective column, such that each of the columns is coupled to a respective group of exchange wires.

19. A computer according to claim 18, wherein a first one of the columns is spaced from a first group of wires by a first physical distance, and a second one of the columns is spaced from a second group of wires by a second physical distance, wherein the second physical distance is greater than the first physical distance, wherein a compensation delay is provided in a column to switching fabric path component between the first column and the first group of wires, whereby a column to switching fabric path delay of the first column is the same as a column to switching fabric path delay of the second column.

20. A computer according to claim 19 wherein the compensation delay comprises an output compensation delay circuit arranged in the output wires of each processing unit in the first column.

21. A computer according to claim 19 wherein the compensation delay comprises an input compensation delay circuit arranged in the set of input wires for each processing unit in the first column.

22. A computer according to claim 21 comprising a switching compensation delay in a switching control set of wires which extends from each processing unit to its corresponding switching circuitry, the switching compensation delay being determined so that a sum of a delay produced by the input compensation delay circuit and the switching compensation delay is the same for each column.

* * * * *